United States Patent
Ma et al.

(10) Patent No.: US 12,282,862 B2
(45) Date of Patent: Apr. 22, 2025

(54) METHOD AND SYSTEM FOR PROVIDING A GRAPHICAL USER INTERFACE USING MACHINE LEARNING AND MOVEMENT OF THE USER OR USER DEVICE

(71) Applicant: MYPLANET INTERNET SOLUTIONS LTD, Toronto (CA)

(72) Inventors: Daniel Ma, Toronto (CA); Gregory Jason Fields, Waterloo (CA)

(73) Assignee: MYPLANET INTERNET SOLUTIONS LTD., Toronto (CA)

( * ) Notice: Subject to any disclaimer, the term of this patent is extended or adjusted under 35 U.S.C. 154(b) by 1061 days.

(21) Appl. No.: 17/167,790

(22) Filed: Feb. 4, 2021

(65) Prior Publication Data

US 2021/0248490 A1     Aug. 12, 2021

Related U.S. Application Data

(60) Provisional application No. 62/971,438, filed on Feb. 7, 2020, provisional application No. 62/971,420, filed on Feb. 7, 2020.

(51) Int. Cl.
    *G06N 5/04*     (2023.01)
    *G06N 20/00*     (2019.01)
    *G06F 3/0482*     (2013.01)

(52) U.S. Cl.
    CPC ............... *G06N 5/04* (2013.01); *G06N 20/00* (2019.01); *G06F 3/0482* (2013.01)

(58) Field of Classification Search
None
See application file for complete search history.

(56) References Cited

U.S. PATENT DOCUMENTS

2014/0128105 A1*   5/2014   Su .................. H04W 4/021
                                                                   455/456.3
2018/0373402 A1*   12/2018   Fidler .................. G06N 20/00

OTHER PUBLICATIONS

Massimo, David, et al. "Learning User Preferences by Observing User-Items Interactions in an IOT Augmented Space: Adjunct Publication of the 25th Conference on User Modeling, Adaptation and Personalization." ACM Conferences, Jul. 1, 2017. https://dl.acm.org/doi/pdf/10.1145/3099023.3099070. (pp. 35-40) (Year: 2017).*

(Continued)

*Primary Examiner* — Kakali Chaki
*Assistant Examiner* — Michael H Hoang
(74) *Attorney, Agent, or Firm* — Tarolli, Sundheim, Covell & Tummino LLP

(57) ABSTRACT

The present method and system are for providing a graphical user interface using machine learning and movement of the user or user device. In an example, the method and system comprise, training a context analyzer machine learning model with training motion data for a training activity context, the context analyzer for predicting a predicted activity context from new motion data; training a response analyzer machine learning model with training usage data and training user responses for the training activity context for a user interface, the response analyzer for predicting the predicted user response from the predicted activity context and new usage data; predicting the predicted user response from motion data and usage data using both the context analyzer and the response analyzer; and determining a preferred variation for the user interface using a predetermined performance metric and the predicted user response.

17 Claims, 23 Drawing Sheets

(56) References Cited

OTHER PUBLICATIONS

Furnkranz, Johannes, et al. "Preference-Based Reinforcement Learning: A Formal Framework and a Policy Iteration Algorithm—Machine Learning." SpringerLink, Aug. 10, 2012. https://link.springer.com/article/10.1007/s10994-012-5313-8.(pp. 126-156) (Year: 2012).*

Eftimov, Tome, Peter Korosec, and Barbara Korousic Seljak. "Data-Driven Preference-Based Deep Statistical Ranking for Comparing Multi-Objective Optimization Algorithms." SpringerLink, Jan. 1, 1970. https://link.springer.com/chapter/10.1007/978-3-319-91641-5_12. (pp. 138-149 ) (Year: 2018).*

* cited by examiner

*Traditional website, running on a mobile browser, with content and GUI controls designed for simplicity on mobile phones.*

*Traditional website, running in a browser, on a mobile phone, with the GUI adapted in real-time to be most effective when the device is shaking and moving 10-12 mph (i.e. - on a moving bicycle)*

*Traditional website, running in a browser, on a mobile phone, with the GUI adapted in real-time to be most effective when ambient light is low, device is not shaking, but moving 30+ mph (i.e. - in a moving car)*

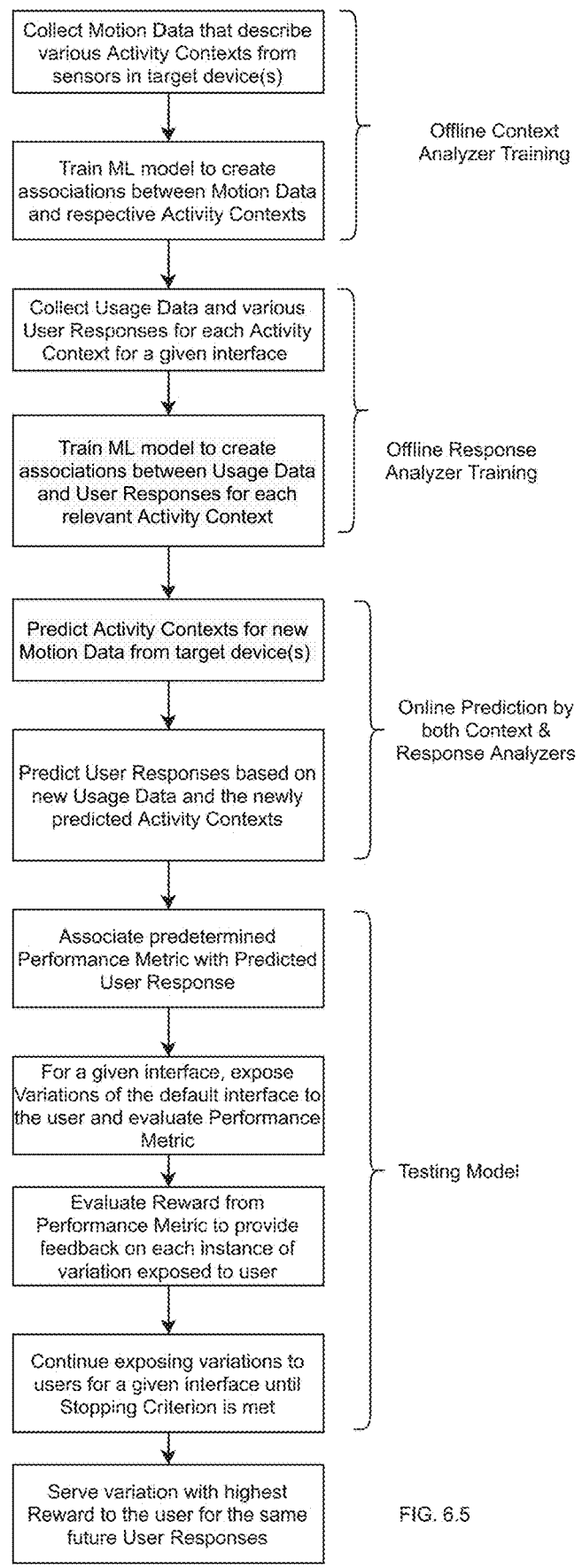
FIG. 6.5

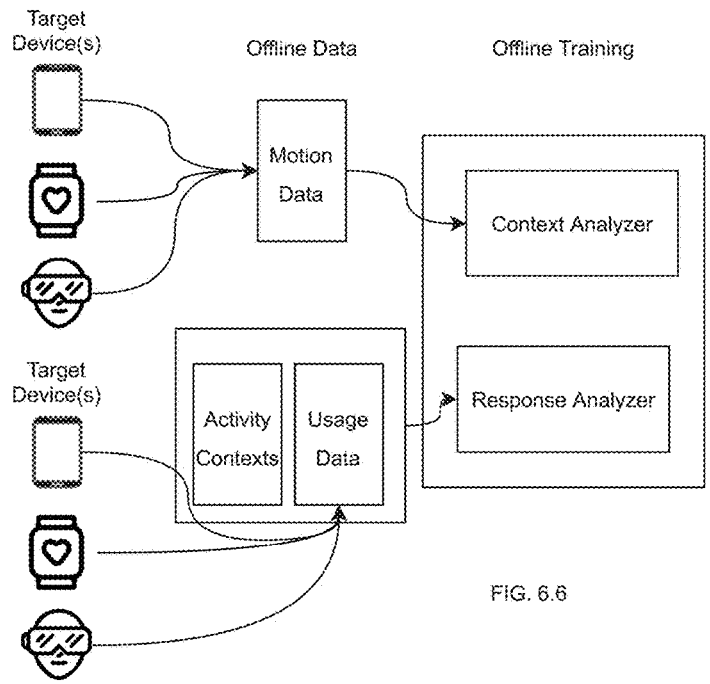
FIG. 6.6
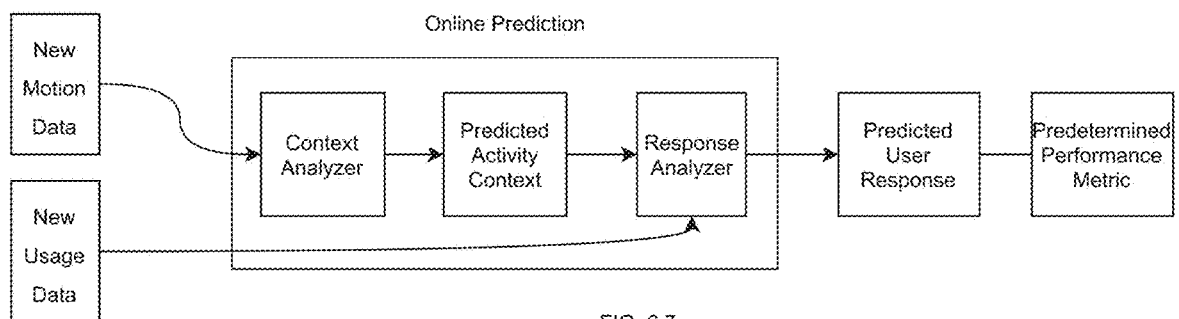
FIG. 6.7
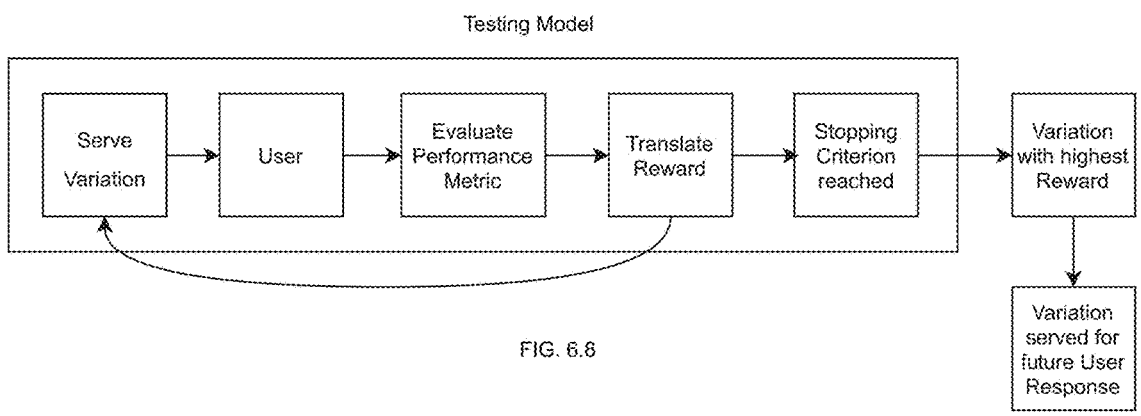
FIG. 6.8

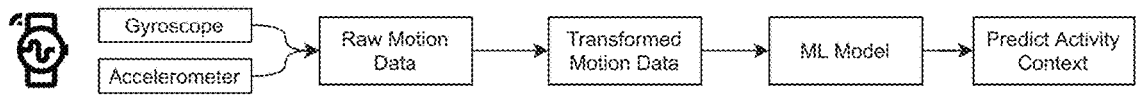
FIG. 13
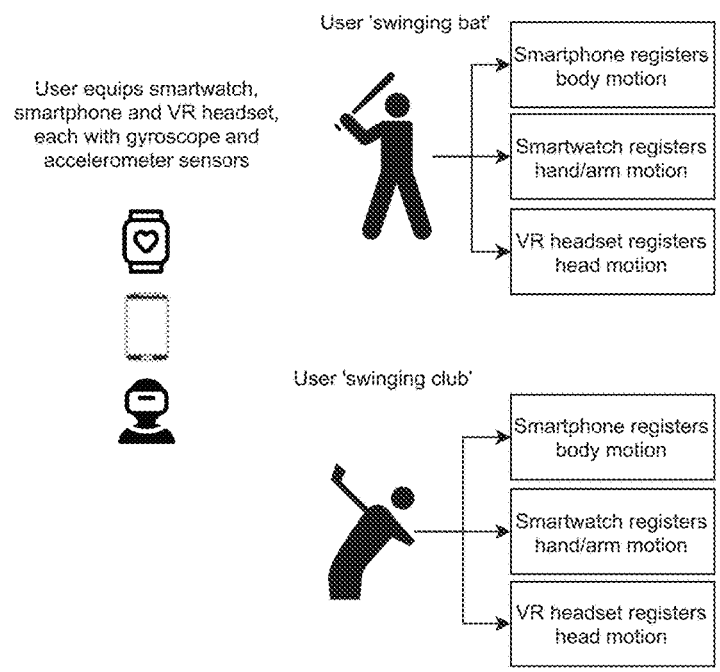
FIG. 13.1
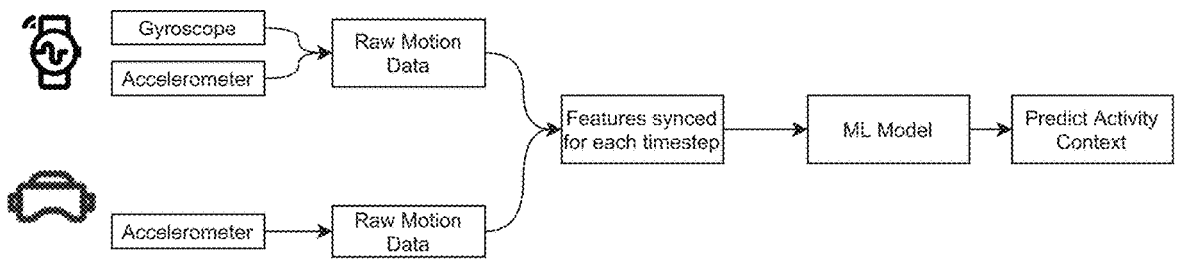
FIG. 13.2

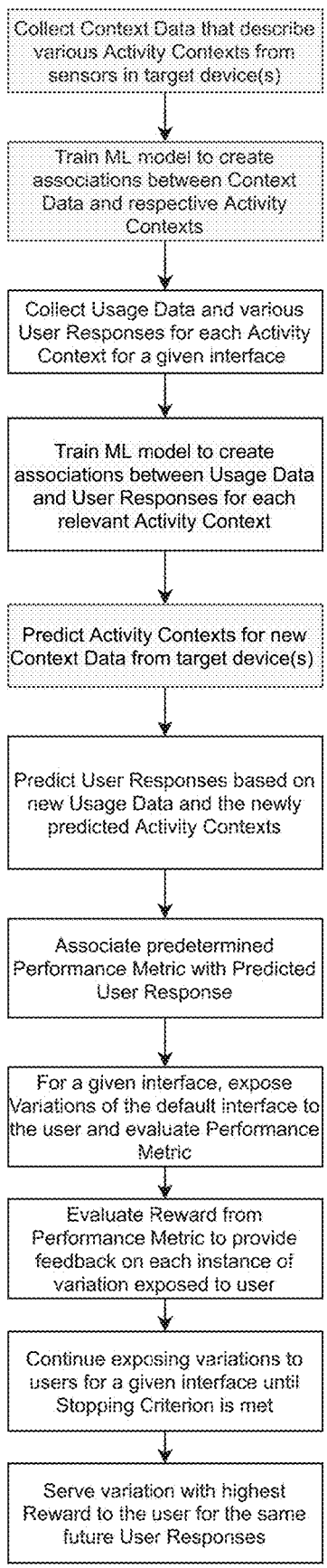
FIG. 31
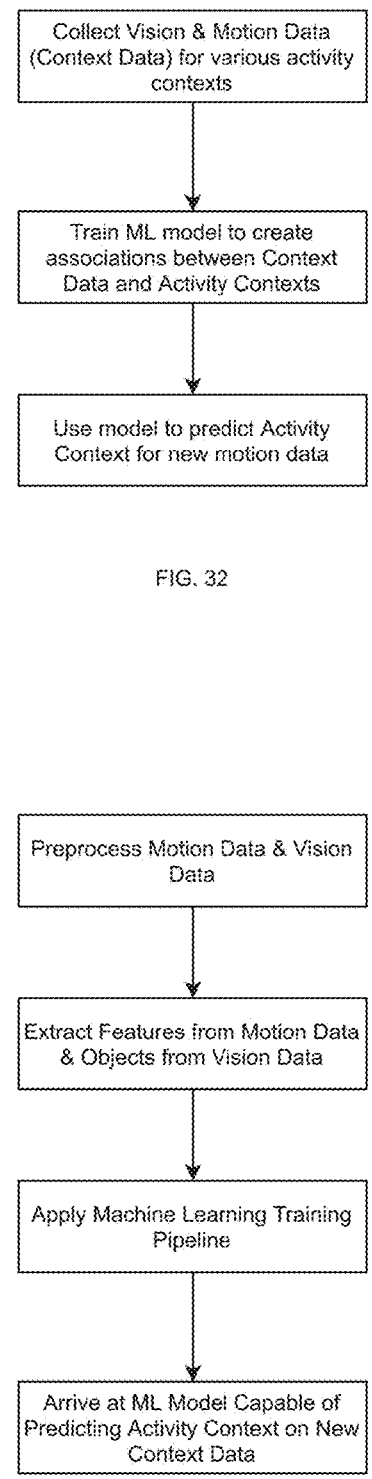
FIG. 32
FIG. 33

METHOD AND SYSTEM FOR PROVIDING A GRAPHICAL USER INTERFACE USING MACHINE LEARNING AND MOVEMENT OF THE USER OR USER DEVICE

RELATED APPLICATIONS

This application claims the benefit of U.S. Provisional Application Ser. No. 62/971,420, filed Feb. 7, 2020 and U.S. Provisional Application Ser. No. 62/971,438, filed Feb. 7, 2020, the entirety of which is incorporated by reference herein.

BACKGROUND

Graphical User Interfaces (GUI) such as web pages or application screens (collectively referred to herein as app screens) can be configured to change based on the context in which the device or web page is being used or viewed.

For example, front-end development packages such as REACT or BOOTSTRAP are configured to allow for GUI layout changes to a webpage/graphical user interface based on device-detected criteria such as the size and/or the orientation of the screen.

Beyond size and orientation, people's daily routines include being in motion: moving between meetings, from home to the office, and exercising. While in various states of motion, we still need to be connected to information and people throughout the day, often through smartphones, smart watches and even in-car telematics. The applications we use, and the device on which they run, are not equally designed to support people's needs while in motion. What someone needs when sitting at a desk is very different from what someone might need when running and glancing at their smartphone.

SUMMARY

The applications people use, and the app screens, should adapt themselves to the user's current state of motion, acting on user's behalf without requiring user action.

An improvement for the method and system is that it may adapt to specific user needs in the context of user motion and movement, enabling a better user experience in on-the-go environments vs current approaches. In commercial applications such as e-commerce and marketing, the method and system may improve conversion and increase revenue in those applications by generating, evaluating, and optimizing from a range of user experience options.

In an aspect, a method is disclosed, the method comprising, training a context analyzer machine learning model with training motion data for a training activity context, the context analyzer for predicting a predicted activity context from new motion data; training a response analyzer machine learning model with training usage data and training user responses for the training activity context for a user interface, the response analyzer for predicting the predicted user response from the predicted activity context and new usage data; predicting the predicted user response from motion data and usage data using both the context analyzer and the response analyzer; and determining a preferred variation for the user interface using a predetermined performance metric and the predicted user response.

In an embodiment, the method further comprises, serving the preferred variation for the predicted user response for the user interface to a user with a user response that is the equivalent to the predicted user response. In another embodiment, the method wherein, the training motion data and the motion data are collected from at least 2 sensors, and the at least 2 sensors are for measuring the motion of different parts of the user's body. In another embodiment, the method wherein, the training motion data and the motion data are collected from at least 2 sensors, and the at least 2 sensors are for measuring the motion of the user's body and the motion of the user's environment. In another embodiment, the method wherein, wherein, the step of training a context analyzer machine learning model, further comprises: collecting the training motion data for the training activity context from a sensor for measuring movement of the user's body; and training the context analyzer machine learning model with the training motion data for the training activity context. In another embodiment, the method wherein, the step of training a response analyzer machine learning model, further comprises: collecting the training usage data and the training user responses for the training activity context for the user interface; and training the response analyzer machine learning model with the training usage data and the training user responses for the training activity context for the user interface. In another embodiment, the method wherein, the step of predicting the predicted user response, further comprises: predicting the predicted activity context from the motion data using the context analyzer machine learning model; and predicting the predicted user response from the usage data and the predicted activity context using the response analyzer machine learning model. In another embodiment, the method wherein, the step of determining a preferred variation for the user interface, further comprises: serving a variation, from a set of variations, of the user interface to the user for the predicted user response; receiving a user response, corresponding to the predicted user response, for the user interface from the user for the variation; evaluating the predetermined performance metric associated with the predicted user response to determine a reward for the variation served using the user response; repeating the serving, receiving, and evaluating steps for each variation in the set of variations, until a stopping criterion is met; and determining the preferred variation as the variation with the reward that has a highest value. In another embodiment, the method further comprising, associating a predetermined performance metric with the predicted user response.

In another aspect, a system is disclosed, the system comprising: a memory; a processor, operatively connected to the memory, the processor configured to: train a context analyzer machine learning model with training motion data for a training activity context, the context analyzer for predicting a predicted activity context from new motion data; train a response analyzer machine learning model with training usage data and training user responses for the training activity context for a user interface, the response analyzer for predicting the predicted user response from the predicted activity context and new usage data; predict the predicted user response from motion data and usage data using both the context analyzer and the response analyzer; and determine a preferred variation for the user interface using a predetermined performance metric and the predicted user response.

In an embodiment, the system further comprises, serving the preferred variation for the predicted user response for the user interface to a user with a user response that is the equivalent to the predicted user response. In another embodiment, the method wherein, the training motion data and the motion data are collected from at least 2 sensors, and the at least 2 sensors are for measuring the motion of different parts of the user's body. In another embodiment, the system wherein, the training motion data and the motion data are collected from at least 2 sensors, and the at least 2 sensors are for measuring the motion of the user's body and the motion of the user's environment. In another embodiment, the system wherein, wherein, the step of training a context analyzer machine learning model, further comprises: collecting the training motion data for the training activity context from a sensor for measuring movement of the user's body; and training the context analyzer machine learning model with the training motion data for the training activity context. In another embodiment, the system wherein, the step of training a response analyzer machine learning model, further comprises: collecting the training usage data and the training user responses for the training activity context for the user interface; and training the response analyzer machine learning model with the training usage data and the training user responses for the training activity context for the user interface. In another embodiment, the system wherein, the step of predicting the predicted user response, further comprises: predicting the predicted activity context from the motion data using the context analyzer machine learning model; and predicting the predicted user response from the usage data and the predicted activity context using the response analyzer machine learning model. In another embodiment, the system wherein, the step of determining a preferred variation for the user interface, further comprises: serving a variation, from a set of variations, of the user interface to the user for the predicted user response; receiving a user response, corresponding to the predicted user response, for the user interface from the user for the variation; evaluating the predetermined performance metric associated with the predicted user response to determine a reward for the variation served using the user response; repeating the serving, receiving, and evaluating steps for each variation in the set of variations, until a stopping criterion is met; and determining the preferred variation as the variation with the reward that has a highest value. In another embodiment, the system further comprising, associating a predetermined performance metric with the predicted user response.

In another aspect, a non-transitory computer readable medium is disclosed, the non-transitory computer readable medium is configured to perform the disclosed method steps.

There is a method for GUI adaptations to client devices, the method comprising: collecting i) usage data from a first computing device and a first graphical user interface (GUI), the usage data generated by a user of the first computing device and the graphical user interface and ii) context data from the first computing device or relating to a context of the first computing device; transforming the collected usage data and context data for use in a machine learning system; identifying at least one user intention associated with the transformed usage data and transformed context data by processing the transformed usage data and transformed context data and using the machine learning system; determining a set of GUI adaptations, to increase a chance of success of the at least one user intention, based on the identified at least one user intention.

The set of GUI adaptations may further comprise editing a set of GUI call to action (CTA) components and the determining further comprises selecting a GUI CTA component corresponding to each of the at least one identified user intentions without the user selecting the identified user intention. The method may further comprise: modifying the first GUI by displaying the selected GUI CTA components on the GUI. The method may further comprise: modifying a second GUI by displaying the selected GUI CTA components on the GUI. The second GUI may be part of the first computing device or part of a second computing device. The set of GUI adaptations may further comprise specifying GUI general configurations and the determining further comprises picking GUI general adjustments associated with the transformed usage data and transformed context data by processing the transformed usage data and transformed context data and using the machine learning system. The method may further comprise: changing the first GUI by implementing the computed GUI general adjustments. The collecting may further comprise obtaining context data from a second computing device or relating to a context of the second computing device.

BRIEF DESCRIPTION OF THE FIGURES

FIG. 6.5 is a flowchart depicting an embodiment of the method.

FIG. 6.6 is a schematic diagram depicting an embodiment of offline training.

FIG. 6.7 is a schematic diagram depicting an embodiment of online prediction.

FIG. 6.8 is a schematic diagram depicting an embodiment of the testing model.

FIG. 13 is a drawing depicting an embodiment of motion data processing.

FIG. 13.1 is a drawing depicting example Activity Contexts.

FIG. 13.2 is a drawing depicting an embodiment of motion data processing from 2 devices.

FIG. 31 is a flowchart depicting an embodiment of the method using Context Data.

FIG. 32 is a flowchart depicting another embodiment of the steps for offline training of the Context Analyzer.

FIG. 33 is a flowchart depicting an embodiment of the steps for training the ML model to create associations between vision data, motion data, and Activity Context.

FIGURE NUMBERS AS USED IN THE FIGURES

Figure 1:
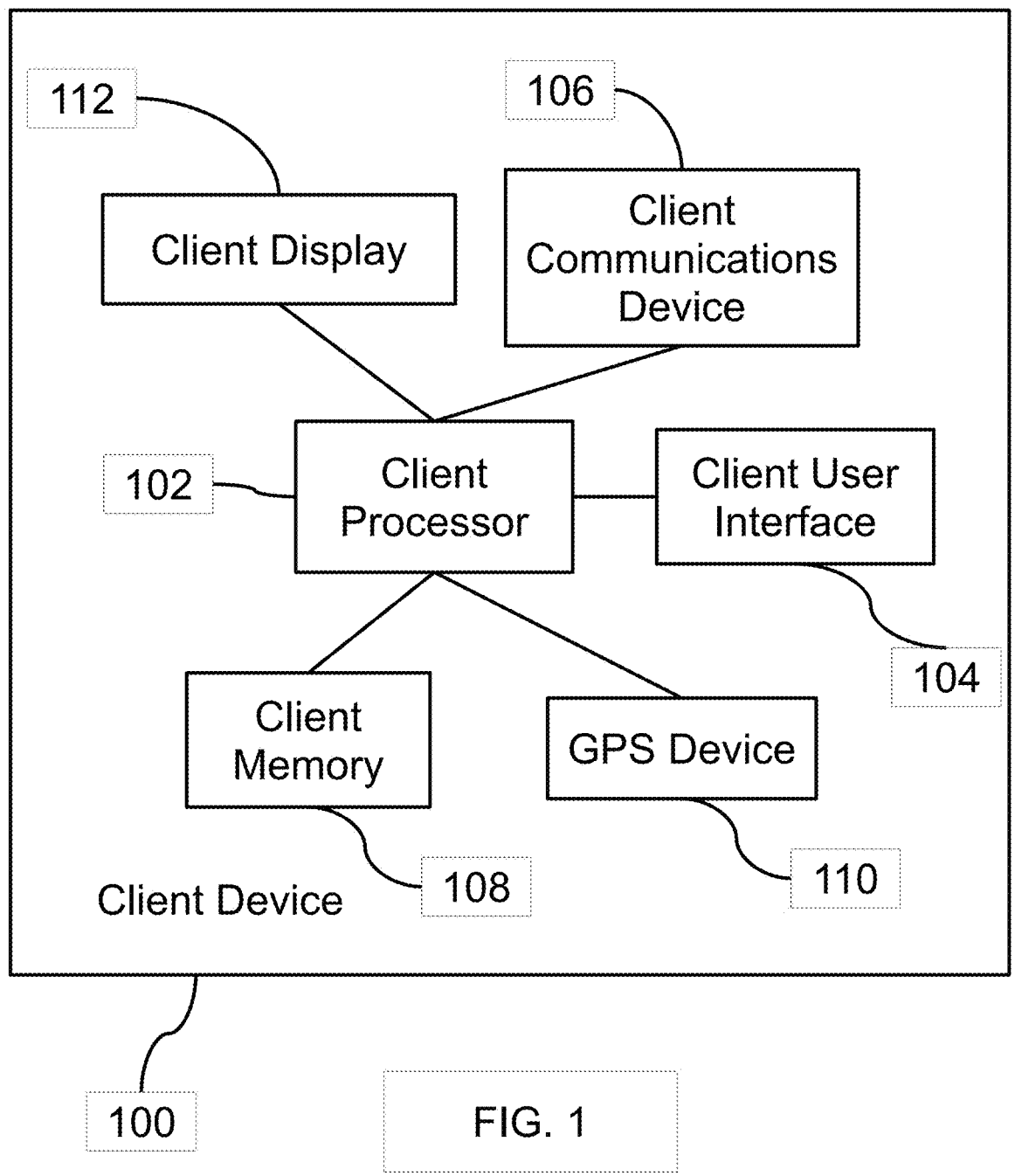
FIG. 1 is a schematic diagram depicting an embodiment of the client device.

The following is a non-exhaustive list of the figure numbers as used in the figures.
100 Client Device
102 Client Processing Device
104 Client User Interface
106 Client Communication Device
108 Client Memory Device
110 Client GPS
112 Client Display
114 Camera Device
116 Machine Vision System (MVS)
200 Server
202 Server Processing Device
204 Server Communication Device
206 Server Memory Device
208 Machine Learning System
300 Collect Usage Data from Graphical User Interface
302 Transform Collected Usage Data
304 Identify User Intention(s)
306 Determine, communicate and implement proposed GUI adaptations
308 Collect post-update usage data and update ML system
400 Graphical User Interface
402 Title
404/406 Textual information
408 Graphics
410 Chat button
412 Menu
502 Reserve now GUI CTA element
504 GUI elements/GUI CTA elements
506 Handlebars
602 Use voice commands GUI CTA element
604 GUI elements/GUI CTA elements
3600 Augmented Reality (AR) Interface
3600a-e Detected Objects
3608 User Interface Variation

DETAILED DESCRIPTION

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations.

All of the implementations described below are exemplary implementations provided to enable persons skilled in the art to make or use the embodiments of the disclosure and are not intended to limit the scope of the disclosure.

The scope of the invention is defined by the claims. There is no intention to be bound by any expressed or implied theory in the preceding Technical Field, Background, Summary, or the following detailed description.

It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise.

It is understood that the phrase "at least one" is equivalent to "a". The aspects (examples, alterations, modifications, options, variations, embodiments and any equivalent thereof) are described regarding the drawings.

It should be understood that the invention is limited to the subject matter provided by the claims, and that the invention is not limited to the particular aspects depicted and described.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Figure 1A:
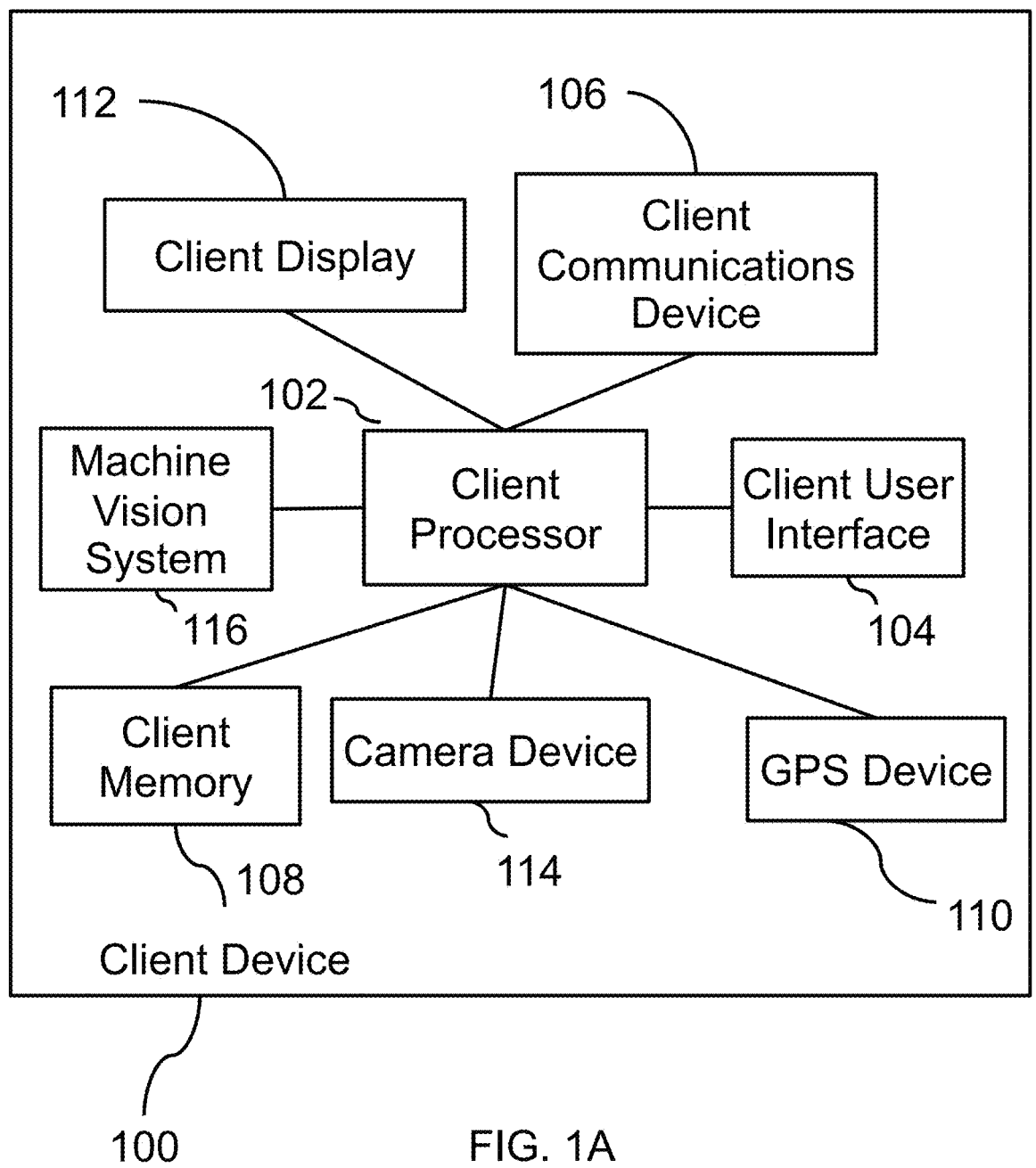
FIG. 1A is a schematic diagram depicting another embodiment of the client device.

Referring now to FIG. 1, a schematic illustrating example components of a client device 100 is depicted. Another embodiment of the client device is shown in FIG. 1A. In the illustrative embodiment, the client device 100 Includes a client processing device 102, a client user interface 104, a client communication device 106, a client memory device 108, a client global positioning system (GPS) 110, and a client display 112.

It will be appreciated that the client device 100 can include some combination of the components described or other additional components not described herein. Examples of additional components include, but are not limited to, a sensor, a client physical keyboard, a personal area network device (e.g., BLUETOOTH), an audio device, etc. Examples of client devices 100 include, but are not limited to, smartphones, tablets, desktop computers, laptop computers, thin clients, smart glasses or headsets, other XR capable devices, etc.

The client processing device 100 is configured to run (or execute) processor-executable instructions (or commands). Examples of client processors include, but are not limited to, QUALCOMM systems on a chip (SOC), APPLE A8 PROCESSORS, SAMSUNG SOCs, INTEL Mobile Processors, INTEL Laptop Processors, INTEL Desktop Processors, etc. The client processing device 100 includes client memory 108. The client memory device 108 includes, but is not limited to read only memory (ROM), random access memory (RAM), and/or persistent storage such as, but not limited to, hard drives, solid state drives (SSD), flash drives, etc. The client memory device 108 is configured, at least in part, for storing processor-executable instructions. These process-executable instructions are configured to be executed by the one or more client processors. The client memory device 108 stores data generated or received by the client device 100. The client memory device 108 can include, but is not limited to, a hard disc drive, an optical disc drive, and/or a flash memory drive, SSDs, etc. The client processing device 102 can execute the operating system of the client device 100. In embodiments where the client processing device 102 includes two or more processors the processors can operate in a parallel or distributed manner.

The client device 100 also includes a Client GPS device 110. The Client GPS device 110 determines, at least in part, a location of the client device 100 by communicating with a plurality of GPS satellites. The Client GPS device 110 can perform known triangulation techniques to determine the GPS coordinates of the client device 100. It will be appreciated that any other suitable component for determining the location of the client device 100 can be used without departing from the scope of this disclosure. Examples of other location techniques include WiFi triangulation, approximation of location by nearest WiFi hotspot, determining a general location from an IP address, etc.

The client user interface 104 allows a user to interact with the client device 100. Examples of a client user interface 104 include a graphical user interface (GUI) displayed on a touch screen display of the client device. In some examples the GUI may be rendered by a web browser on the client device 100. Examples of web browsers include, but are not limited to, GOOGLE CHROME, APPLE SAFARI, MOZILLA FIREFOX, etc. It will be appreciated that a user interface includes any way a user might interact with the client device. This can include, but is not limited to, a touch screen, a physical keyboard, a mouse, a microphone and speaker (e.g., an audio interface), a tactile interface (e.g., buttons, vibrations), and/or sensor interfaces (e.g., hall effect sensors, accelerometers, drop sensors, pressure sensors, eye tracking, etc.).

The client communication device 106 allows the client device 100 to communicate with another device over a communications network (also known as a network-connected device). Other network-connected devices the client device 100 might communicate with include, but are not limited to, a server, other client devices, a cloud-connected hosted application, etc. The communication device 106 can include one or more wireless transceivers for performing wireless communication (e.g., WiFi, LTE, 5G, etc.) and/or one or more communication ports for performing wired communication (e.g., Ethernet).

The client display of the client device may include a graphical user interface (GUI) that displays information in a graphical, human-comprehensible format. The GUI may include a plurality of input objects which allow the user to provide commands to the client device 100. These client devices 100 may use desktop and mobile browsers, at least in part, to render GUIs on the displays of the respective devices. In other examples the operating system of the respective computing device is configured to render, at least in part, a GUI on the client display 112 of the client device 100. Alternatively, client display 112 may also display space data, which may be data (generally visual, such as images and/or videos) that shows a particular "space". Spaces may be real world spaces (as may be captured by camera device 114) that may also have one or more augmented reality (AR) features. Space data may also comprise virtual spaces (which may exist in an app, such as a virtual reality app) or be a combination of real world, augmented real world, virtual reality, mediated reality, and virtual reality.

Figure 3:
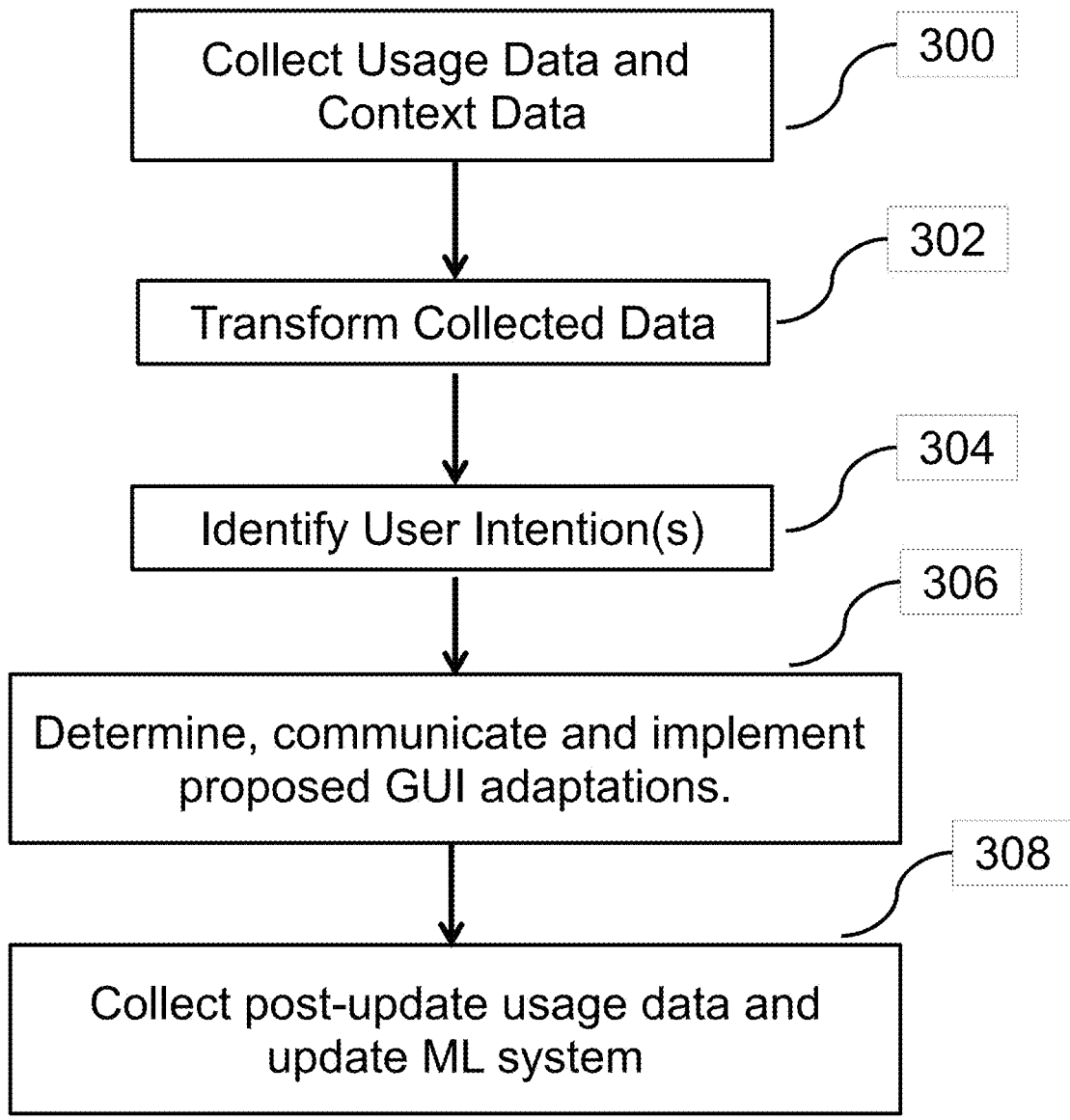
FIG. 3 is a flowchart depicting an embodiment of the present disclosure.
Figure 4:
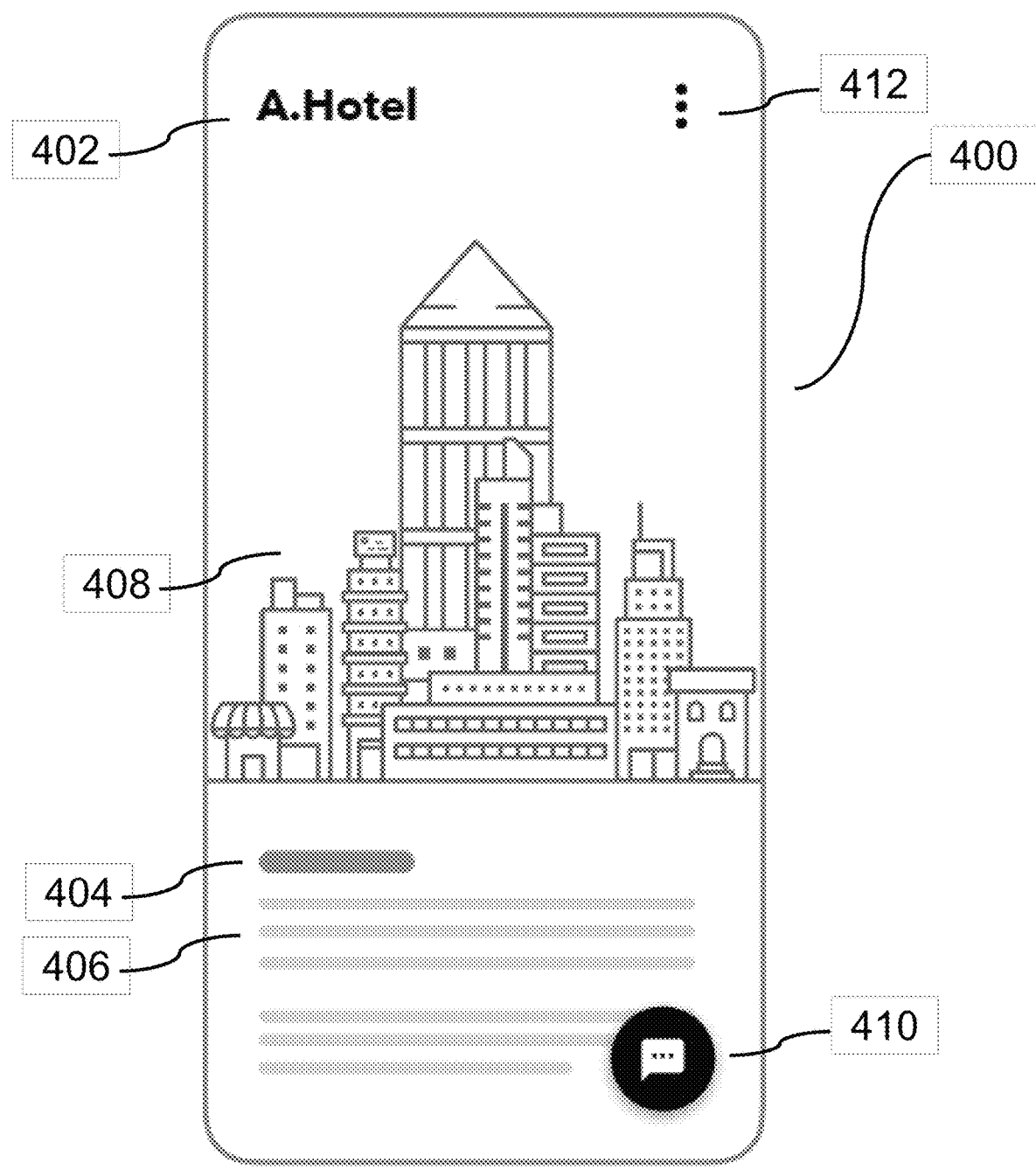
FIG. 4 is a drawing depicting a graphical user interface as presented to a user in a first context.
Figure 5:
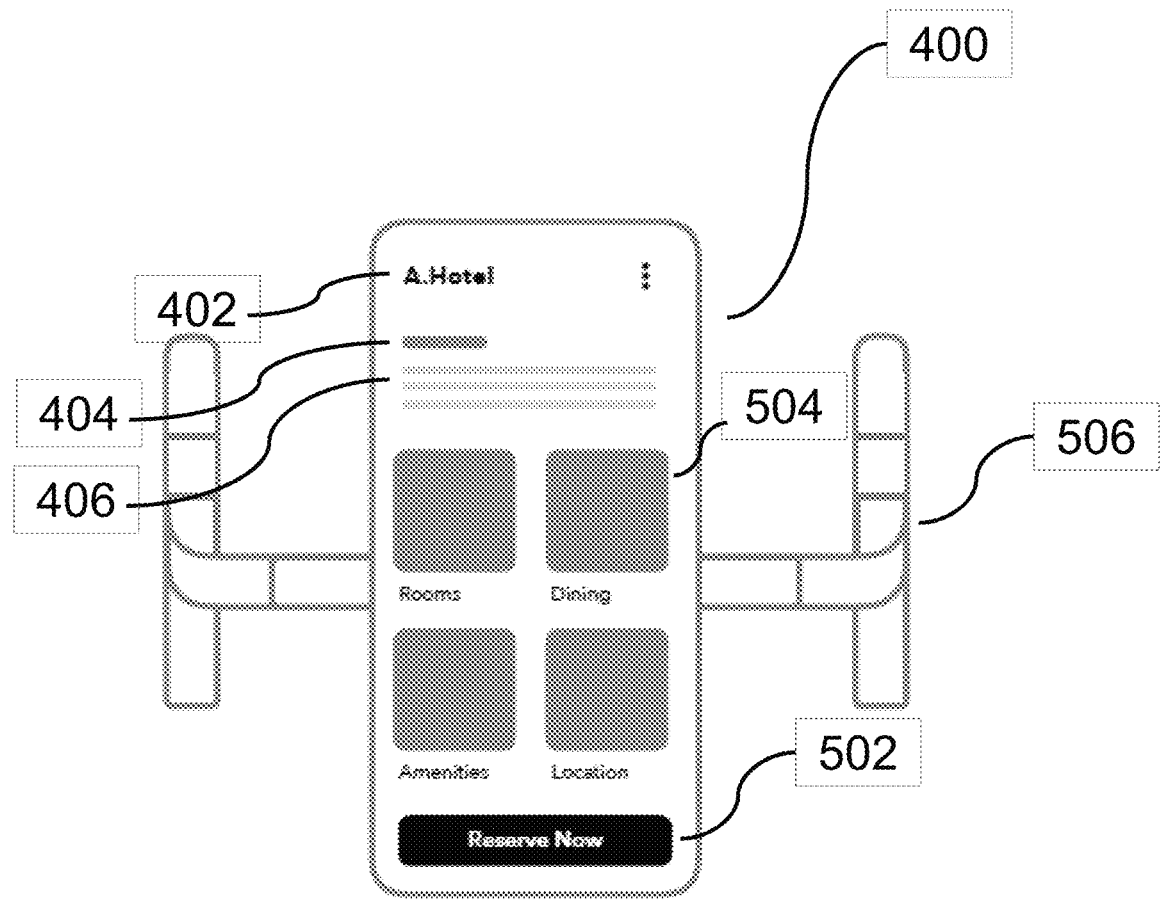
FIG. 5 is a drawing depicting a graphical user interface as presented to a user in a second context.

Furthermore, these client devices 100 may be capable of running standalone applications (or apps) created for use on the client device 100. It will be appreciated that these apps are similar to mobile browsers in that they can, at least in part, render GUIs or app screens, on the display of the respective client device 100. It will be further appreciated that applications may have one or more app screens, that may have different GUI components (such as information components, and call to action components, such as shown in FIGS. 3-5), each of which may be adjusted as described herein.

Referring now to FIG. 1A, camera device 114 may be part of client device 100 and may include front and/or back camera(s) that may be able to record both still pictures and moving video. Camera device 114 may be able to capture space data and display the space data on client display 112. Camera device 114 may comprise dedicated memory and/or dedicated processing power or may rely largely on client memory 108 and client processor 102.

Machine vision system (MVS) 116 may allow client device 100 to recognize and evaluate images and videos. MVS 116 may take image or video data (such as space data) as an input and provide various output, as may be determined or configured according to the contemplated use. MVS may perform: a) Object Localization, for example to locate the presence of objects in an image and indicate their location with a bounding box where the input may be an image or video and the output may be one or more bounding boxes (indicating a point, width, and height for example). b) Object Detection, for example to locate the presence of objects with a bounding box and types or classes of the located objects in an image, where the input may be an image or video and the output may be one or more bounding boxes and a class label or other descriptive data, for each bounding box. c) Object Segmentation, for example to locate the presence of objects in an image, where the input may be an image or video and the output may be similar to object detection but highlighting the specific pixels of the object, as opposed to a bounding box.

Machine vision system 116 may partially comprise camera device 114 as well as processing capabilities that may be stored on client memory 108 and performed by client processor 102, such as image processing software and machine vision application software (which may be part of applications or web pages described herein). MVS 116 may be local or remote to client device 100, depending on hardware and design constraints of the application of embodiments of the invention described herein. MVS 116 may be any number of commercial systems if the output facilitates the features of embodiments of the invention described herein. MVS 116 may be trained with many different types of datasets, such as Microsoft COCO™.

Figure 2:
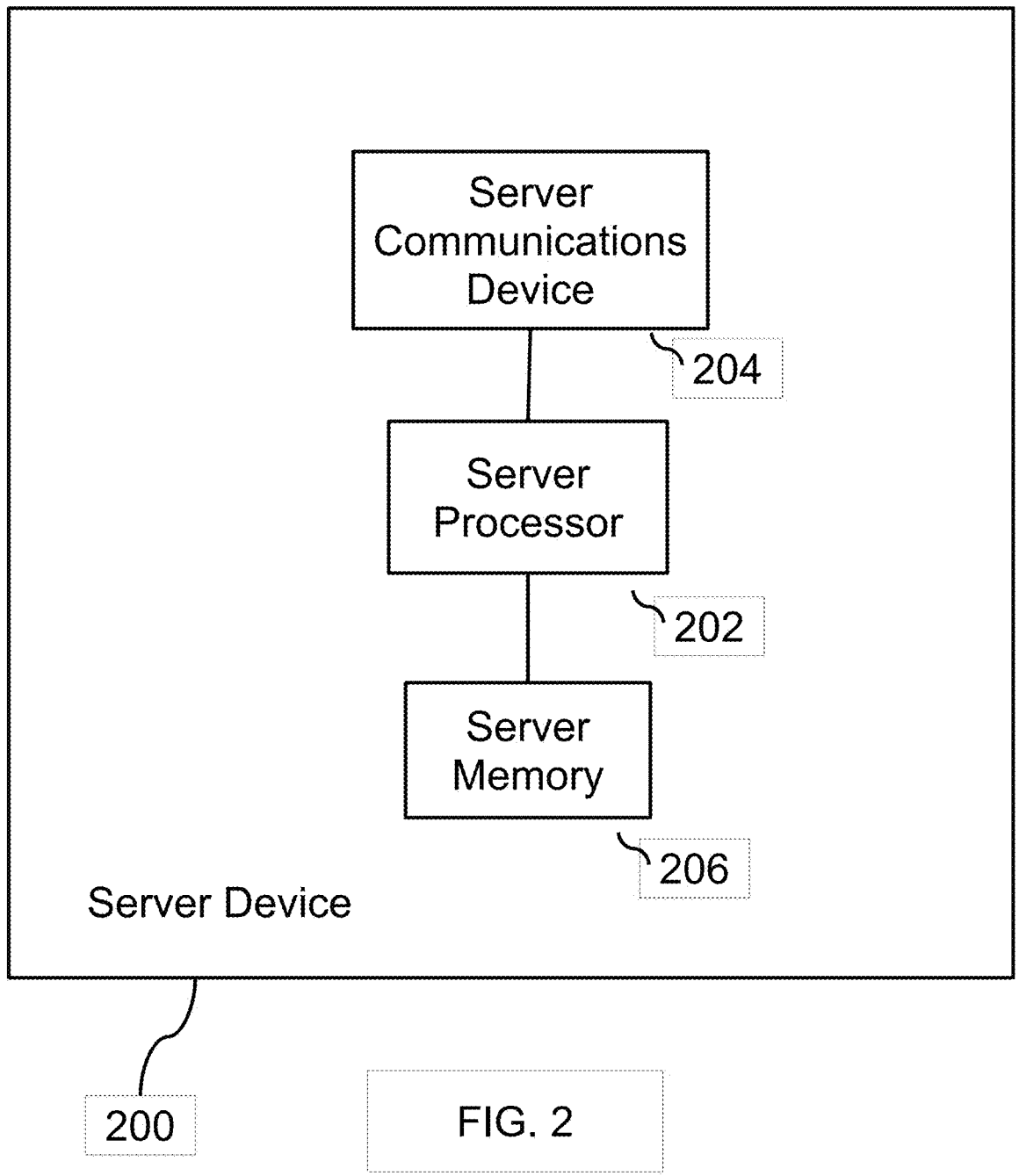
FIG. 2 is a schematic diagram depicting an embodiment of the server.
Figure 2A:
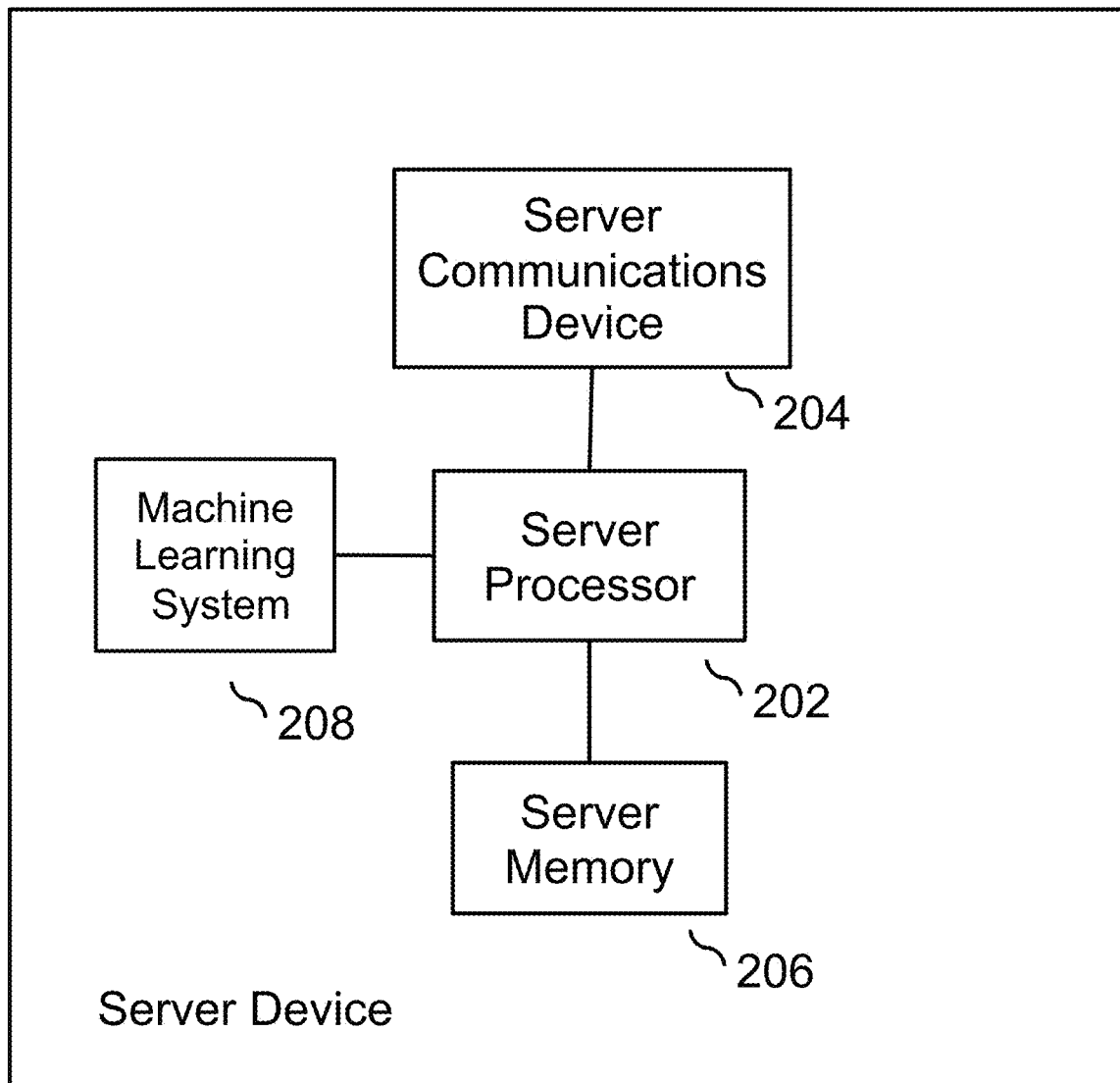
FIG. 2A is a schematic diagram depicting another embodiment of the server.

Referring to FIG. 2, a server 200 is depicted. Another embodiment of the server is shown in FIG. 2A. The server 200 is configured to process, among other things, requests from a client device 100. The server 200 includes, at least, a server processing device 202, a server communication device 202, and a server memory device 206. The server processing device 202 includes server memory 206. Examples of server memory include, but are not limited to, read only memory (ROM) and random access memory (RAM). The server memory 206 stores processor-executable instructions and one or more processors that execute the processor-executable instructions. In embodiments where the server processing device 202 includes two or more processors, the processors can operate in a parallel or distributed manner.

The server communication device 204 allows the server 204 to communicate with another network-connected device. The server communication device 204 can include one or more wireless transceivers for performing wireless communication (e.g., WiFi, LTE, 5G) and/or one or more communication ports for performing wired communication (e.g., ETHERNET).

The server memory device 206 is a device that stores data generated or received by the query server. The server memory device 206 can include, but is not limited to a hard disc drive, an optical disc drive, and/or a flash memory drive. Further, the server memory device 206 may be distributed and located at multiple locations. In some embodiments, the server memory device 206 stores a database and/or other programs and applications that are necessary for the functioning of the server. In another embodiment, the server 200 has a machine learning system 208 for server side processing of machine learning software and/or data.

Usage Data, as used herein, refers to data relating to the use of client device 100. Usage Data may be more granular and may include i) data about the use of an application (mouse movements, clicks, and the like), ii) data about the use of a particular app screen of an application (for example by a single user, a set of users such as a team, or all users of such app screen), iii) data about a particular user (such as their gender, age and the like), iv) session data. Usage Data may include historical (such as from previous sessions) and current information. Usage Data may be stored and/or accessed in various ways and different levels of granularity or filtering, such as by returning all Usage Data relating to a user, all Usage Data for an app screen for a team of users, and the like.

Motion Context Data, as used herein, refers to data relating to the motion context of client device 100 and/or the context of the user of client device 100. Motion Context Data may include device positional information (such as the 3D coordinates of the device), motion of the device (speed, acceleration, bumpiness or tremors, direction), lighting (such as lighting level, like whether in ambient light), location, date, time, orientation (up/down, left/right, tilts, etc.), retinal information (the presence of retinal detection for example), heart rate, temperature, barometric information, proximity, moisture sensors, and the like. In practice almost any form of Context Data may be used, and such may depend more on limitations of client device 100 and what sensors it provides. Context Data may include historical (such as from previous sessions—for example if a current location, date and time are known but a light sensor or temperature sensor are not available on client device 100 then historical Context Data may be used to infer light conditions and/or temperature) and current information. Context Data may be stored and/or accessed in various ways and different levels of granularity or filtering, such as by returning all Context Data relating to a user, all Context Data for an app screen for a team of users, and the like.

Context Type, as used herein, refers to a context classification that may assist in determining user intentions and/or GUI adaptations. Any number of context classifications may be used and any Context Data may be used to apply a Context Type to a particular user and/or client device 100 at a particular point in time. Usage Data may be used to determine Context Type, but such determination may be largely based on Context Data.

An exemplary set of classifications may be "Stationary—good light", "Stationary—low ambient light", "Moving—bicycle, rider", "Moving—car, driver" and "Moving—car, passenger". Of course the ML system may make such determinations based on more nuances and nuanced data, but in general such classifications may relate to the following contexts:

a) "Stationary—good light". Client device 100 is not moving and is in good light. An example of which may be found in FIG. 4.
b) "Stationary—low ambient light". Client device 100 is not moving but is in poor light.
c) "Moving—bicycle, rider". Client device 100 is moving at 10-12 mph and is shaking or experiencing some bumpiness.
d) "Moving—car, driver". Client device 100 is moving at greater than 30 mph, may be subject to ambient light, and either the user has not indicated they are a passenger and/or client device 100 is not being tilted or otherwise moved around (which would have indicated it was a passenger actively using client device 100).
e) "Moving—car, passenger". Client device 100 is moving at greater than 30 mph, may be subject to ambient light, and either the user has indicated they are a passenger and/or client device 100 is being tilted or otherwise moved around (to indicate the passenger is actively using client device 100).

Referring now to FIG. 3 a flowchart depicting an embodiment of the present disclosure is provided.

In this embodiment Usage Data and Context Data are collected 300—from a displayed graphical user interface, client device 100, and/or historical data stores of Usage Data and/or Context Data. It will be appreciated that graphical user interfaces are displayed on the display of a client device 100. It will further be appreciated that the Usage Data and Context Data may be from one client device 100 or from more than one client device 100.

In this embodiment client device 100 is configured, among other things, to collect, store, and transmit Context Data and Usage Data associated with a user's interactions with the GUI.

In this example the client device 100 (or client devices 100) collects data from the client user interface 104 and/or the client display 112. This data includes, but is not limited to:

f) Usage Data: mouse position and/or movement data, time spent hovering over UI elements such as menus, buttons, scrollbars, webpage cookie data, browser tracking data, client device tracking data, etc.;

g) Context Data: location data retrieved from the GPS device 110; pitch, roll, and yaw data from accelerometers and/or gyroscopes; amount of light.

This collected Usage Data is then made available to consumers of this data. Examples of consumers include, but are not limited to, servers 200, applications residing on the client device 100 or the server 200, an application programming interface subscriber (API), etc. This collected Context Data and Usage Data is typically made available to other applications through an application programming interfaces (APIs). These APIs allow consumers to access data and functionality from the client device 100. These APIs can be made available to other applications at the operating system level or at the browser level, for example. In an embodiment the collected data is requested via the API and then collected, by the consumer, for further processing. In other embodiments the Usage Data or Context Data may be streamed or otherwise transmitted to a consumer. In another embodiment the Usage Data or Context Data requested via the API may be collected (or consumed) by the device on which the GUI is displayed. For example, devices with sufficient processing power and storage may store the data on the client (or local) device 100 for further transforming and/or processing. In other embodiments the consumer is a remote server. The requested Context Data or Usage Data is transmitted over a network (for example, the Internet) to the server, where the data is collected for processing. In some embodiments the server is a network-connected computer in a data center. In other embodiments the server may be a virtual machine operating in a shared-computing environment (or cloud-computing environment). Examples of cloud-computing environments include, but are not limited to, AMAZON EC2, MICROSOFT AZURE, HEROKU, GOOGLE CLOUD COMPUTE, etc.

Once the Context Data or Usage Data is collected 300 it is transformed 302 so that it can be processed by the machine learning system to identify one or more user intentions 304.

The collected data is transformed by a processor, for example, to convert it from one format to another. In this case the collected data would be transformed from its collected format to a format that is usable by the machine learning system. Of course the neural network or machine learning system could similarly perform the task of converting the data so it is suitable for use.

Once the data is transformed 302 it is processed to identify one or more user intentions 304.

At 304 the intention is to properly identify what one or more user intentions (which may be a set of user intentions) a user of client device 100 (or one or more users of client devices 100) may have. The identified user intentions may be for one or more client devices 100 and may be the same or different for each client device 100. In some embodiments the user intentions may be different for each client device 100, but may relate to the same ultimate user intention (such as an ultimate user intention is available immediately on a client device 100, while on a second client device the ultimate user intention requires at least one user intention to be performed first—such as to open an app before taking a particular action within the app).

In an embodiment the transformed Context Data and Usage Data are processed by a machine learning system that is configured to identify one or more user intentions associated with the collected and transformed data. Identifying user intentions may be accomplished by the following sub-steps:

h) Determine a starting set of user intentions. This may be accomplished by determining what user intentions (or 'actions' or 'calls to action') are available based on the app screen being displayed, or that will be displayed, to the user. For example, on GUI 400 a user may be able to open a menu 412, initiate a chat with an operator of the app (oral via a call and/or textual) via 410 or 604, view room or dining information, view amenities or view the hotel's location via GUI elements 504, reserve a room via 502, see room options and availability, seek directions to the hotel, see parking information or call the hotel via 604, or interact with app screen via voice commands via 602.

i) Adjust user intentions from the starting set of user intentions based on Context Data.
  i) Determine a Context Type. The ML system may determine a Context Type for the Client Device 100 at the particular time. Of course the ML system may use Context Data from a second client device 100 to help make a more accurate determination of a Context Type.
  ii) Based on the Context Type, add or eliminate user intentions from the starting set of user intentions that are not likely relevant for the Context Type. For example, if the "Moving—bicycle, rider" Context Type is determined then text chat may be eliminated or the parking information may be eliminated, or if the "Moving—car, driver" Context Type is determined then add the interact with app screen via voice commands via 602. By way of further example, one client device 100 may be moving quickly (a mobile phone) while another is not (a smartwatch on a wrist, where the user is not moving).

j) Adjust user intentions from the starting set of user intentions based on Usage Data.
  i) Based on the Usage Data adjust the user intentions, possibly individually for each client device 100. For example, perhaps client device 100 has never been used to chat with an operator of the app, so the chat option may be removed, or a user never needs directions (so seeking directions may be removed).

k) Arriving at a set of potential user intentions based on the starting set of user intentions and the adjustments thereto.

It is to be understood that the various sub-steps of 304 may be used in parallel, in series, together and iteratively—with the goal of becoming more confident that the at least one user intention is included, while reducing as many as possible potential user intentions that are not actual user intentions.

In an embodiment the machine learning system/model word2vec is used to process the transformed Usage Data and/or Context Data. Word2vec is an open-source machine learning algorithm. It will be appreciated that other machine learning systems or algorithms can be used without departing from the scope of this disclosure. In some embodiments the machine learning system is implemented on a remote server or cloud computing environment. In another embodiment the machine learning system (or model) is implemented as a JAVASCRIPT library that resides on the same local machine as the GUI. The machine learning system (or model) would then use the same processor as used by the GUI/User Interface to process the transformed Usage Data. In yet another embodiment the machine learning system is implemented both on the server and on the client device. In this embodiment the machine learning system is trained on the server where computing power is more readily available. Once the machine learning system training is complete a trained model is distributed to the client device(s). This model can then be used to identify user intentions on the client device 100. It will be appreciated that, in some embodiments, the machine learning system (ML system) is taught to identify user intentions and/or Context Data by being trained on training (or historical) data. That is, the machine learning system is trained (or learns) using pre-generated training data sets that correspond to specific user intentions and/or Context Types.

As depicted in FIG. 3 at least one user intention associated with the transformed Usage Data and Context Data is identified by the machine learning system once the transformed Usage Data and Context Data has been processed. The ML system processes the transformed data by comparing the transformed data with historical data it obtained during a training phase. The ML system then can then identify patterns in the transformed data that correspond to intention and context type patterns the ML system had learned during the training phase. These similar patterns can then be used to discern the probable intention of the user based on the transformed Usage Data and Context Data.

Once the user intention(s) are determined at 304 GUI adaptations are determined, communicated and implemented 306.

As used herein, GUI adaptations comprise specifying or editing GUI call to action (CTA) components and picking GUI general adjustments:
- l) Specifying or editing GUI call to action (CTA) components comprises ensuring that each user intention has a GUI CTA component that is ready to be displayed on the GUI, and that no other GUI CTA components are to be displayed on the GUI. For example, starting from GUI 400 in FIG. 4, i) GUI CTA component 410 may be removed, or may be specified or selected to remain for display and ii) one or more GUI CTA components 504 may be selected or added to be displayed.
- m) Picking or specifying GUI general adjustments or GUI configurations means making changes to the GUI, other than specifying GUI CTA components to display, designed to increase the chance of success of a user intention. This may include traditional adjustments or configurations such as based on screen size and the like. Further, such may include changes based on the Context Data and/or Usage Data—for example to darken GUI CTA components given the lighting (such as GUI CTA components 604) or darkening other parts of GUI 400 (such as to increase contrast), increasing font sizes, reducing the size of GUI components that are not GUI CTA components (such as reducing the size of title 402 and textual information 404 and 406 on FIGS. 5 and 6 as compared to their size on FIG. 4), and the like.

GUI adaptations may be made in real-time and either before a particular GUI 400 is displayed or in the course of it being displayed. It is to be understood that GUI adaptations may be used in conjunction with, or instead of, general GUI changes that already exist and are made for different screen sizes and the like.

Determining GUI adaptations comprises performing the processing required to arrive at the adaptations themselves—largely as described herein. Once determined the GUI adaptations may be communicated to client device 100. This may be simple as the GUI adaptations may be determined on client device 100 or may be made remotely and then communicated to client device 100, as described herein. Implementing the GUI adaptations may be via client device 100 rendering GUI 400.

Once the GUI has been updated with the GUI adaptations, data is returned to the ML system on how the user interacted with the GUI and in particular with any GUI CTA components, such as 410, 504, 502, 602 and 604. In this embodiment additional data related to the task or user intention that the user completed (i.e., post-completion data) is collected from the client device 100. This data is then transformed and sent to the ML system.

This post-completion data is then used by the ML system to determine whether the GUI adaption was a success or a failure. The ML system processes the post-completion data along with the previously collected user and GUI application data, uses to refine its heuristics for identifying a user's probable intention.

In this embodiment if a user completes the user intention by using one of the GUI CTA components that was presented to the user then the GUI adaptation is considered a success. If the user does not use one of the GUI CTA components to complete the user intention but instead uses another part of the GUI then the GUI change is considered a failure. Of course, given that multiple GUI CTA components may be presented, success may be binary (was one of them used) and also non-binary (were more GUI CTA components presented than necessary). In such a case both the binary and non-binary post-completion data may be provided and used by the ML system to refine the heuristics. It will be appreciated that other events or actions could be used to determine whether the GUI change is a success or failure such as, but not limited to, hovering over the prefabricated user interface component, performing an action that is influenced by, but not necessarily related to the prefabricated user interface component (e.g., opening a chat window instead of using the prefabricated user interface component to compose an email), or hovering over some other part of the GUI. In addition, success may be achieved on one client device 100, but then not on a second client device 100 that may have provided Context Data or Usage Data. In such cases the neural network may treat the combined adaptations as leading to the success, as either client device 100 may have resulted in the success and/or may treat the adaptations on the client device 100 that resulted in the performance of the user intention as preferable over the other.

The method depicted in FIG. 3 may be repeated at any desired frequency, depending on such factors as processing power, network speed, user experience and the like.

Figure 6:
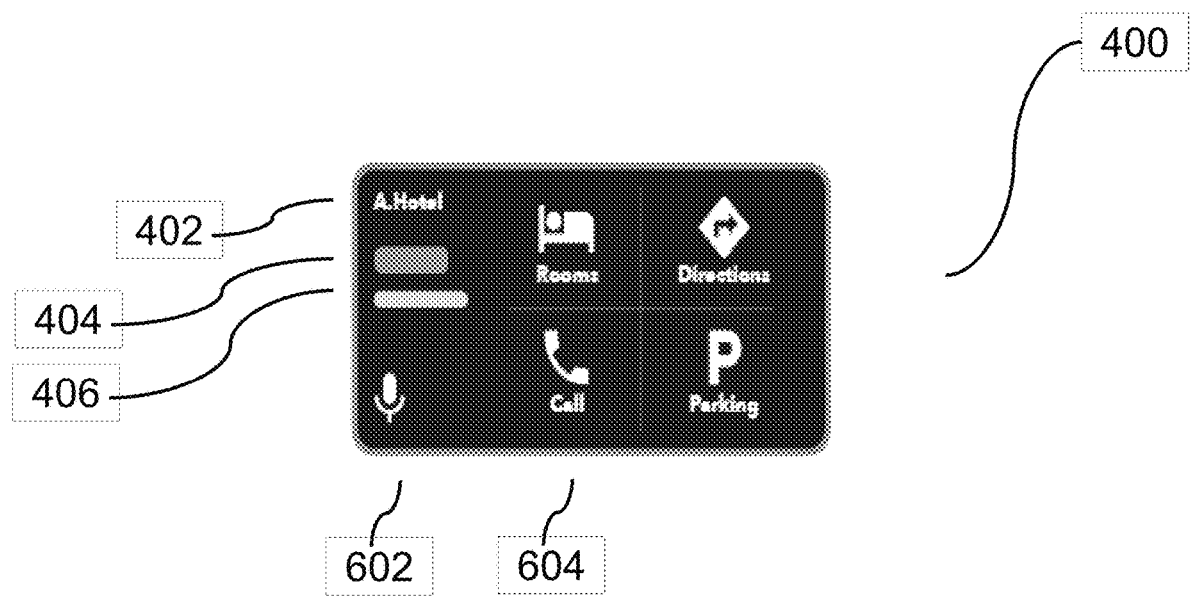
FIG. 6 is a drawing depicting a graphical user interface as presented to a user in a third context.

The sequence of FIG. 4 to FIG. 6 depicts how GUI 400 may be modified based on an identified user intention and determined GUI adaptations.

Referring now to FIG. 4, a GUI 400 is depicted. In this example the GUI 400 may be in a start, or unmodified state. The GUI 400 includes default user interface components such as title 402, menu 412, graphics 408, textual information 404 and 406 and chat button 404. Without particular user intentions or Context Data (perhaps other than information about the screen of client device 100) GUI 400 in FIG. 4 may be presented on client device 100..

If client device 100 becomes in bumpy motion, and at a pace of 10 mph, then ML system may determine a user is on a bike (and in particular mounted to handlebars 506 of a bike). In this Context Type, and as shown in FIG. 5, several GUI adaptations may be implemented, for example to remove graphics 408, add various GUI CTA components 504 and add a "reserve now" button 502, for example if bikers, the particular user, or typical users from the users team, have often reserved a room while riding a bike.

If client device 100 becomes in much faster motion, such as 30 mph, and with low lighting, then ML system may determine a user is in a car. In this Context Type, and as shown in FIG. 6, several GUI adaptations may be implemented, for example to shrink title 402 and textual information 404/406 and to darken the GUI (including the backgrounds of GUI CTA components) to increase contrast and make it easier for a user to select a GUI CTA component 604.

In another embodiment, a user begins using an XR application on client device 100. User, session, GUI, 3D content, screen space and controls may be used and assessed. Client device 100 may use camera device 116 to capture images and client device 100 may capture up/down, back/forward, pitch, roll, yaw, speed, as described herein via sensors and GPS device 110. Server 200 may contribute historical examples and then machine learning system or neural network 208, with other parts of the system herein, may implement collecting usage data and space data, transforming and processing collected data, identifying user intention(s) and objects in the space data, associating user intention(s) and objects in the space data; determine, communicate, and implement proposed GUI adaptations; and collecting post-update usage data and update the ML model. The adapted user experience of the GUI may then be rendered as shown in 3600.

The following are a few exemplary embodiments of aspects of the invention described herein:

n) Disambiguating Via Secondary IoT Device: Mobile Phone & Smart Watch
 i) User is on a moving train on her way to work, carrying her smartphone (a first client device 100) and wearing her smartwatch (a second client device 100).
 ii) She opens an application on her smartphone.
 iii) Signals provided by her smartphone to the NN (Context Data and/or Usage Data) leads the prediction engine to assume she is moving fast, suggesting the GUI of her application be adapted accordingly.
 iv) Signals from her smartwatch are also provided to the NN (Context Data and/or Usage Data) and include additional insights, namely her walking speed is 0.
 v) The NN uses signals from the secondary device to predict the user is moving fast, but her body is stationary, and updates the predicted GUI adaptation accordingly.
 vi) The end result is the system uses signals from both devices to create a more accurate depiction of the user's context of use, and a more accurate prediction of GUI adaptations needed to maximize user success.

o) Ambient Static 2nd Screen: Mobile Phone & Smart Alarm
 i) User hears a loud alarm going off in their house, and they want to silence it right away AND figure out what's going on.
 ii) He picks up his smartphone (a first client device 100) and starts moving quickly across the house towards the alarm.
 iii) Signals provided by his smartphone indicate he's moving quickly, signals from the alarm app on his phone show an alarm sound is currently being played+volume level+alarm/error code, aggregate signals from connected devices in the house (one or more second client devices 100, such as motion sensors, proximity sensors that may be part of appliances and other client devices 100) identify the user's distance to the alarm on the wall (a possible third or "Nth" client device 100) in an adjacent room.
 iv) The NN uses available signals to predict the user is trying to understand what the issue is, and silence the alarm.
 v) NN predicts simplification adaptations to the users' smartphone and the alarm device screens/GUIs, which together enable the user to see the error/issue on the alarm device screen without having to walk all the way across the room, and silence the alarm sound from his mobile device on load of the alarm application.
 vi) The capture of signals from the multiple client devices and the ambient static devices in the home, treatment of signals by the NN, prediction of GUI adaptations, and refresh of the smartphone and physical home device screens all happen in the time it takes for the user to pick up his phone, tap on the alarm app on his phone and see it rendered. Success may be accomplished via the smartphone and/or the alarm screen.

p) Active 2nd Screen: Telematics In-Car Screen+Smart Glasses
 i) User is driving to work in her car, listening to an audio book from an app on her phone (a first client device 100), paired to the cars' infotainment system (a possible second client device 100), while wearing smart glasses (a possible second client device 100).
 ii) Signals from her phone, with audio book app running, connected to her car, include speed, distance travelled, whether the phone is being held/used, if the user is looking at the phone, audio book information, volume levels, and other noise in the car.
 iii) Signals from her smart glasses include live video feed, points of interest, landmarks, what she is looking at in the car, and more.
 iv) The NN uses all available signals to predict the user is driving, listening to an audio book, paying attention to the road, and looking at the infotainment system every so often.
 v) NN predicts the right adaptations to be made to simplify the infotainment system, removing all interactive controls and replacing them with a single voice input control, and places Augmented Reality overlays on key points of interest (PoI) in the road ahead to help divert the user's attention to the road . . . lessening attention diversion coming from the car's infotainment system.

In an embodiment of the method, the steps as shown in FIG. 6.5 are: Offline Context Analyzer Training, Offline Response Analyzer Training, Online Prediction by both Context Analyzer & Response Analyzer, Testing Model, and Serve variation with highest Reward to the user for the same future User Responses.

In another embodiment of the method, the steps as shown in FIG. 6.5 are: Collect Motion Data that describe various Activity Contexts from sensors in target device(s), Train ML model to create associations between Motion Data and respective Activity Contexts, Collect Usage Data and various User Responses for each Activity Context for a given interface, Train ML model to create associations between Usage Data and User Responses for each relevant Activity Context, Predict Activity Contexts for new Motion Data from target device(s), Predict User Responses based on new Usage Data and the newly predicted Activity Contexts, Associate predetermined Performance Metric with Predicted User Response, For a given interface, expose Variations of the default interface to the user and evaluate Performance Metric, Evaluate Reward from Performance Metric to provide feedback on each instance of variation exposed to user, Continue exposing variations to users for a given interface until Stopping Criterion is met, and Serve variation with highest Reward to the user for the same future User Responses.

FIG. 6.6 shows an embodiment of the inputs for the offline training of the Context Analyzer and Response Analyzer. During this stage, Motion Data is collected from one or multiple target devices (i.e. mobile device, watch device, XR device) and paired with the ground truth labels on the Activity Contexts that correspond to each set of collected Motion Data for training of the Context Analyzer. For the offline training phase of the Response Analyzer, Usage Data is collected from one or multiple target devices for various Activity Contexts for training.

FIG. 6.7 shows an embodiment of the required inputs for prediction on new data. To start, new Motion Data is collected from one or multiple target devices and passed into the trained Context Analyzer for a prediction of an Activity Context. Afterwards, the newly predicted Activity Context is combined with the new Usage Data that is collected and inputted into the Response Analyzer for prediction of a new User Response. The predicted User Response is associated with a performance metric that is predetermined.

FIG. 6.8 shows an embodiment of the ML Experimentation Model. Once a new User Response has been predicted (along with its associated performance metric(s)), the ML Experimentation Model is responsible for selecting, and subsequently serving variations of interface to the user based on the predicted User Response. The results of the variations served are then evaluated by the performance metric(s) and translated into a reward as feedback to the ML Experimentation Model to help serve next variations. The ML Experimentation Model continues the cycle of serving variations to the user, evaluating performance metric(s) and translating rewards until a stopping criterion is reached, at which time the variation served with the highest reward is deemed the most desirable interface and served to the user for the same User Responses predicted in the future. The ML Experimentation Model may also be referred to as the Testing Model.

Figure 7:
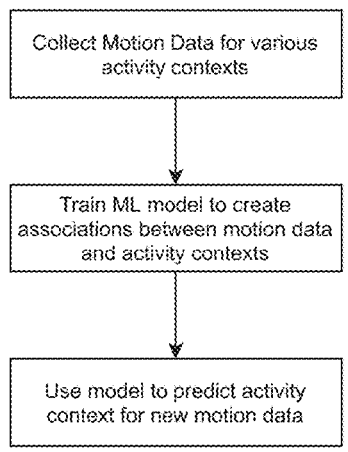
FIG. 7 is a flowchart depicting an embodiment of the steps for offline training of the Context Analyzer.

In an embodiment, referring now to FIG. 7, the Context Analyzer allows predicting of a user's Activity Context based on motion data originating from a device affixed or equipped to the user. The context analyzer requires offline training. The offline training consists of the steps shown in FIG. 7 to arrive at a model capable of predicting Activity Contexts for new motion data: collect motion data for various Activity Contexts, train machine learning (ML) model to create associations between motion data and Activity Contexts, and, use model to predict Activity Context for new motion data.

Activity context describes the overall kinetic state of an user, be it the user in motion or is static. Activity contexts follow a list of pre-defined and well-defined states and may include: standing, walking, running, driving, climbing stairs, riding elevator, and sitting. These Activity Contexts are highly transitory in nature, thus the mechanism needing to predict Activity Contexts are called upon in frequent intervals of time.

In order to be able to accurately predict Activity Contexts, sensory devices are required to determine both the position and orientation of the user. The most common sensors that exist in wearable and mobile devices are the gyroscope and accelerometer and are used for the Context Analyzer.

The gyroscope is capable of measuring rotation of the object it is mounted on in the form of angular velocity such as rotations per second. The accelerometer is capable of measuring linear acceleration in the form of meters per second squared. Both of these devices produce data in three dimensions (x,y,z).

In an embodiment, in the step of the collection of motion data for various Activity Contexts, historical data motion data is collected from a device—wearable or smartphone having both the accelerometer and gyroscope—mounted to individuals' bodies.

The individuals then perform all the activities in the pre-defined list of Activity Contexts, effectively creating ground truth or 'labeling' of the Activity Context for each set of motion data recorded. Data is also collected from the device in various other positions with respect to the individual's body—such as 'holding device at chest level', 'placing device in pocket', 'strapping device to arm'. Data is collected from these scenarios in order to allow predictions for realistic settings on how an user would equip a device.

Figure 8:
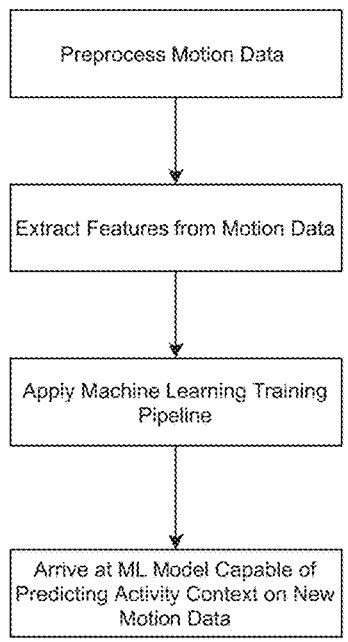
FIG. 8 is a flowchart depicting an embodiment of the steps for training the ML model to create associations between motion data and Activity Context.

Referring now to FIG. 8, the step of training the ML model to create associations between motion data and Activity Contexts, may comprise the steps shown. Once raw data from the gyroscope and the accelerometer are collected, the steps of: preproces motion data, extract features from motion data, applying machine learning training pipeline, are applied to create a Machine Learning model capable of predicting Activity Contexts for new motion data.

Figure 9:
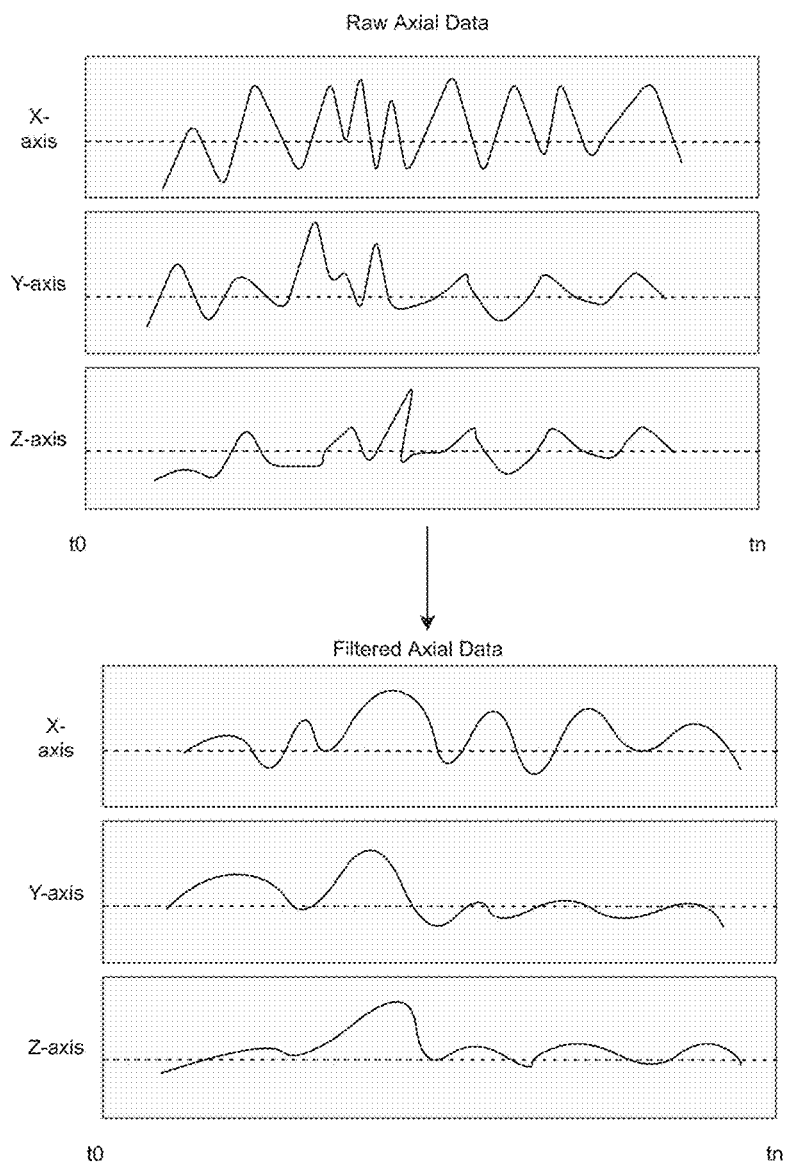
FIG. 9 is a drawing depicting the filtering of axial data.
Figure 10:
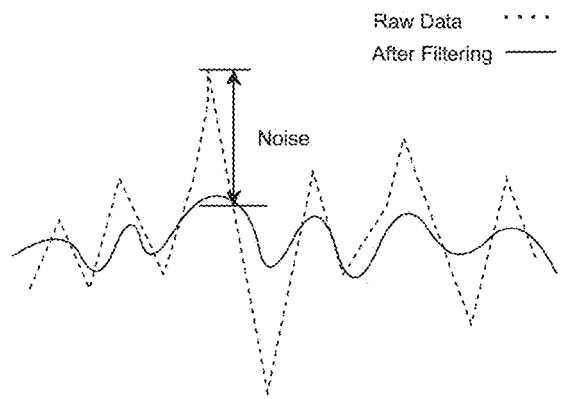
FIG. 10 is a drawing depicting the removal of noise from a signal.

For the step of preprocessing motion data, as shown in FIGS. 9 and 10, raw data originating from the gyroscope and accelerometer consists of two portions: true signal and noise. Raw data by itself is very noisy by nature and distorts the underlying activities or motions that are performed by an individual. The initial step in making the raw data available for modelling is to apply preprocessing to extract the signals. Preprocessing involves preliminary data processing and data cleaning in order to make the data consumable by the machine learning algorithms. During this stage, two main steps are applied: 1. Smoothing or Filtering of axial motion data to remove noise from data, and, 2. Extracting body acceleration data from gravitational acceleration data.

FIGS. 9 and 10 show filtering applied to raw (x, y, z) data originating from an accelerometer. As seen, the filter acts a 'smoothing' agent to reduce the erratic raw recording of the motion data. The filter applied in this scenario is a 'low-pass' filter, which reduces the noise by blocking certain high-frequency data and accepting low-frequency data.

Figure 11:
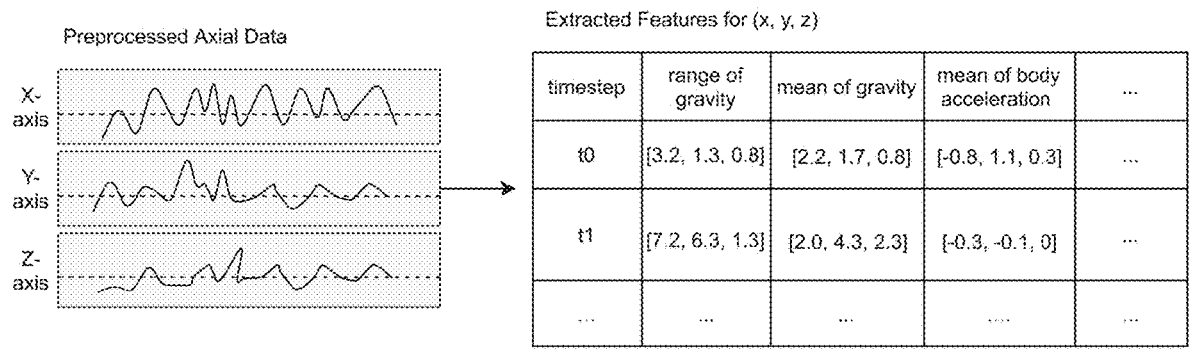
FIG. 11 is a drawing depicting an example of feature extraction from preprocessed axial data.

Then, the step of extracting features from the preprocessed data occurs. After motion data has been preprocessed (removal of noise), the data still requires abstraction in order to provide useful information for a machine learning model. The process of abstraction requires extracting 'features' or useful representations of the preprocessed data. Features are extracted from preprocessed motion data by applying mathematical computations to arrive at a representation for the data for each timestep or window. For example, as shown in FIG. 11, the following represent categories of features extracted for each axis: Summary statistics describing body acceleration from accelerometer (i.e. range, mean, standard deviation of frequencies over a period of time); Summary statistics describing gravitational component of data from accelerometer (i.e. variance, range of gravitational frequencies); and/or Summary statistics describing the speed of rotation from gyroscope (i.e. range, mean, standard deviation of angular rotations over a period of time).

Once all the features have been extracted from the preprocessed data and assigned to a timestep, the next stage is to train a machine learning model that is capable of predicting the right class of Activity Context based on the features. That is, applying the ML training pipeline.

Figure 12:
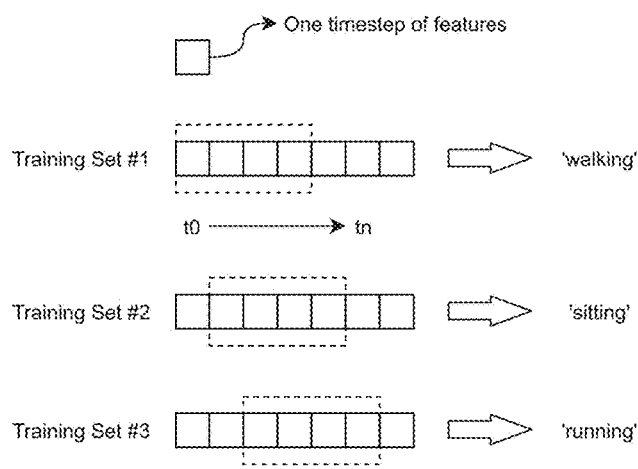
FIG. 12 is a drawing depicting an example of sequential chunking of time stamps.

The timestep data is first split into training and testing sets of data. The training set data contains 70% of all data where the ML model learns associations of features with the labels and the testing set contains the rest of the 30% where the model gets evaluated for performance and makes predictions off of unseen data. The split between the training and testing data can vary depending on the split that yields the best performance for predictions. For example, the actual split of the data can be 80% training data and 20% testing data or 90% training data and 10% testing data. Since data from a sequence of timesteps is required to provide information on the Activity Context, the timesteps with the features are required to be further windowed for training. FIG. 12 shows sequential chunking of four timesteps in the training process, where each chunk of timesteps is associated with an Activity Context based on labels applied to the data at the time of recording.

Once the model is trained to a satisfactory level of accuracy, the model is saved and used for prediction on live data. That is, a ML model capable of predicting Activity Context on new motion data is created.

Other disclosed embodiments detail prediction of the Activity Context based on motion originating from one device. In this embodiment, motion data from 2 or more devices can be used to enhance the performance of the Context Analyzer. In another embodiment, it may be motion data for 2 or more motion sensors that are operatively connected to a device where the sensors are measuring the motion of different parts of the user's body. In another embodiment, it may be motion data for 2 or more devices where the devices are measuring the motion of different parts of the user's body. In another embodiment, it may be motion data from 2 or more motion sensors connected to 2 or more devices. In another embodiment, the motion data may be for measuring the motion of the user's body and the motion of the user's environment. Using motion data from 2 or more devices allows for a wider variety and more nuanced Activity Contexts to be predicted. Also, using motion data from 2 or more devices enhances the performance and accuracy of predictions from the Context Analyzer for a single Activity Context.

When motion data originates just from one target device, there are limitations to the variety and also accuracy of Activity Context predictions. For example, as shown in FIG. 13, motion data originates from both the gyroscope and accelerometer sensors within a smartwatch. The smartwatch by design is intended for users to equip the device on their wrists or hand and therefore, the raw motion data originating from these sensors provide stronger axial signals (aftering noise filtering) for hand-based Activity Contexts than Activity Contexts that focus on other body segments. With just the single smartwatch device, nuanced hand-based Activity Contexts such as 'eating chips', 'eating a burger', 'drinking', 'typing', 'writing', etc. are able to predicted with sufficient accuracy during offline training of the Context Analyzer to be deployed to real users on new motion data. Sufficient accuracy is a subjective measure that is predetermined and may vary across different target devices and interfaces.

Referring now to FIG. 13.1, however, general Activity Contexts (e.g. not hand-based as in the example above) such as 'walking', 'standing', 'sitting', 'playing soccer', etc. are not able to be predicted with satisfactory level of accuracy with a singular smartwatch device and are not included in the prediction from the Context Analyzer for new motion data. For accurate prediction of nuanced Activity Contexts, three or more target devices may be required. For example, the Activity Context of "swinging club" while playing golf and "swinging bat" while playing baseball registers very similar motion data from a singular target device such as a smartwatch. Though both are hand-based activities, "swinging club" and "swinging bat" are sufficiently similar in axial signals that a Context Analyzer trained on motion data from a singular smartwatch would not be able to effectively distinguish the two Activity Contexts.

Motion data from a second target device, a smartphone, is used to register the body movement of the user and the axial data provide signals that the user is not moving. And lastly, the XR headset also equipped by the user is able to register axial data on head motions. When the three sets of motion data are independently inputted into the Context Analyzer for prediction, the Context Analyzer and the underlying ML model is able to recognize the difference between the two Activity Context on the axial data originating from the XR headset. The XR headset contains the gyroscope that registers the motion data that describe the angular tilt of each of the Activity Contexts. In "swinging bat", the XR headset registers a relatively level angle of the user's head while in stance (the user is awaiting for the baseball by looking ahead). In "swinging club", the XR headset registers a relatively low angle of the user's head while in stance (the user is looking down at the golf ball). Labeled training data is collected for the scenario detailed above in order to train the ML model capable of predictions recognizing such Activity Contexts. During the offline training phase, three sets of axial data corresponding to each target device are synchronized in timesteps and inputted into a ML model to create associations between the collective axial data and the labeled Activity Context. The training data is collected from individuals performing the activities while both the wearable watch and the XR headset are mounted on their respective bodies, allowing motion data to be labeled with the activity.

Referring now to FIG. 13.2, in another example, the above diagram shows motion data originating from both the gyroscope and an accelerometer for a wearable watch as well as motion data from an accelerometer from a Virtual Reality headset. In this example, two separate accelerometer sensors exist and readings from both accelerometers can be used to provide better collective axial signals for prediction of a single Activity Context. One embodiment for combining the raw motion data originating from the accelerometers is to calculate the weighted average between the two sets of data at each data point. For example, consider a scenario where a user is performing the Activity Context "situps" with the above two target devices equipped. The merged, post-filtered axial data from the accelerometers can help provide clearer signals to the ML model for such Activity Context. If the XR headset's accelerometer is imprecise or registers noise from unexpected head movements, the signals provided from the accelerometer from the smartwatch may enhance the prediction accuracy. Conversely, if the user is performing "situps" with hands rested by the torso, the accelerometer from the XR headset assists with providing signals. Other embodiments for merging the sensor data include applying the Least-Squares Method or Kalman Filtering, which both function as pre-modelling data transformations that help reduce noise in axial data. Once merged, the features for each timestep for each device are then synced together and fed into the ML model, where the Activity Context can be predicted.

Figure 14:
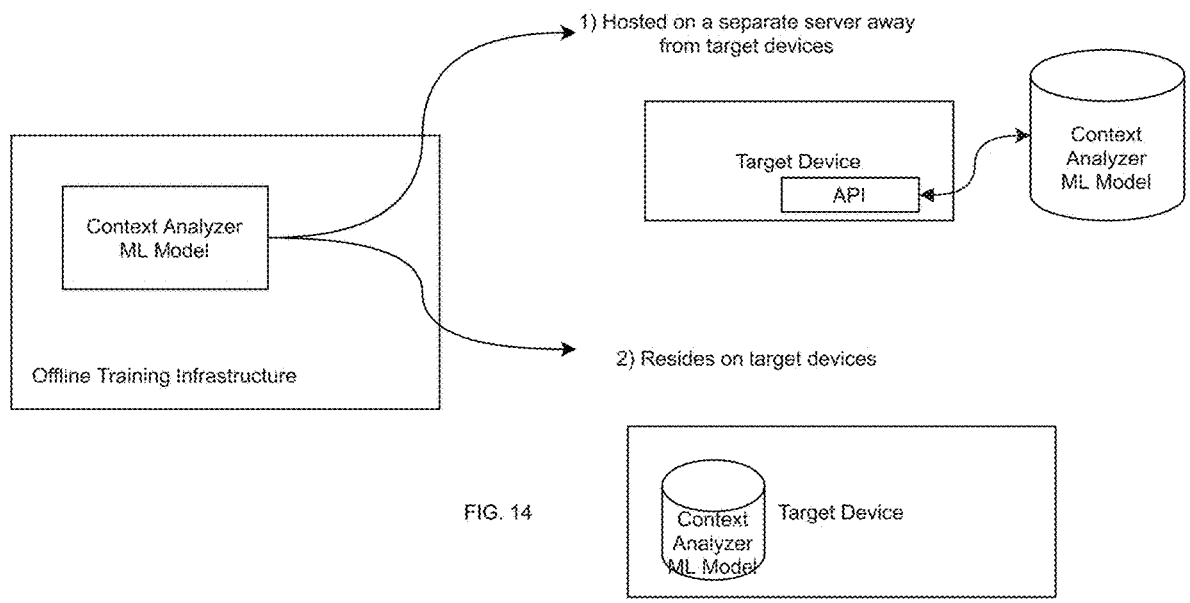
FIG. 14 is a drawing depicting embodiments for Online predictions for the Context Analyzer.

In an embodiment, once the Context Analyzer has been successfully trained, the model is required to be accessed for Online predictions. 'Online' refers to a setting where new, real-time motion data are ingested from the device whereas 'Offline' refers to ingestion of historical data for training. As shown in FIG. 14, the trained ML model can be accessed in two ways (or both): hosting the ML model on a separate server (see FIG. 2A, machine learning system 208) where an API on the target device communicates with the model to make predictions over a network, and/or, directly placing the model in the target device so that the model can be accessed without needing to be connected to a network.

Figure 15:
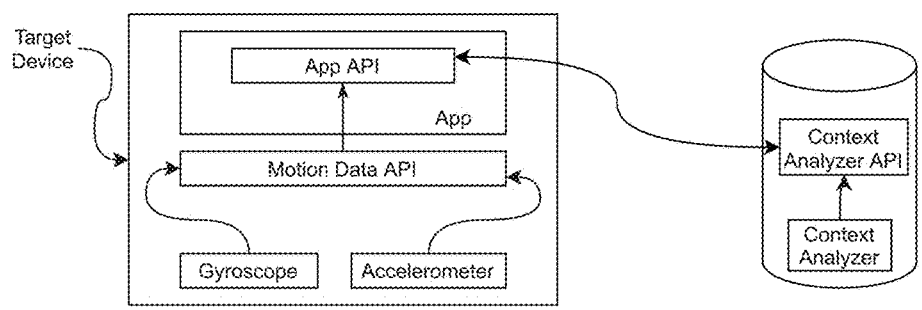
FIG. 15 is a drawing depicting another embodiment of the trained ML model hosted on a separate server.
Figure 16:
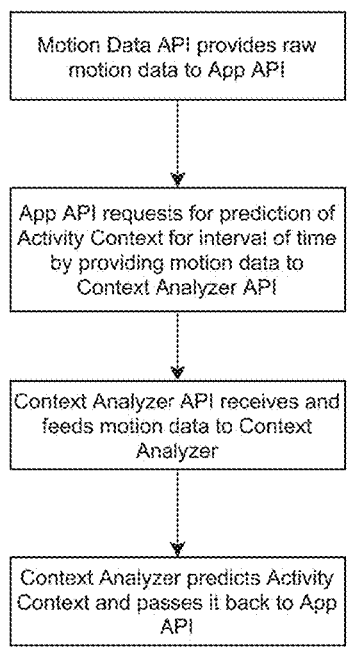
FIG. 16 is a flowchart depicting an embodiment of a prediction of an Activity Context by a Context Analyzer ML model hosted on a server.

An example embodiment of the trained ML model hosted on a separate server is shown in FIG. 15. The following series of steps, shown in FIG. 16, are detailed for one prediction of an Activity Context made from a separate server that is passed to an app that resides in the target device. The steps are: Motion Data API provides raw motion data to App API, App API requests for prediction of Activity Context for interval of time by providing motion data to Context Analyzer API, Context Analyzer API receives and feeds motion data to Context Analyzer, and, Context Analyzer predicts Activity Context and passes it back to App API. The above steps are performed periodically on an interval of time or a fixed interval of time, e.g. 1 to 5 seconds, so that an Activity Context is continuously provided to the app utilizing the Context Analyzer. A skilled person would understand that the interval of time may be adjusted to increase or decrease the rate of predictions subject to computing power and network latency.

Figure 17:
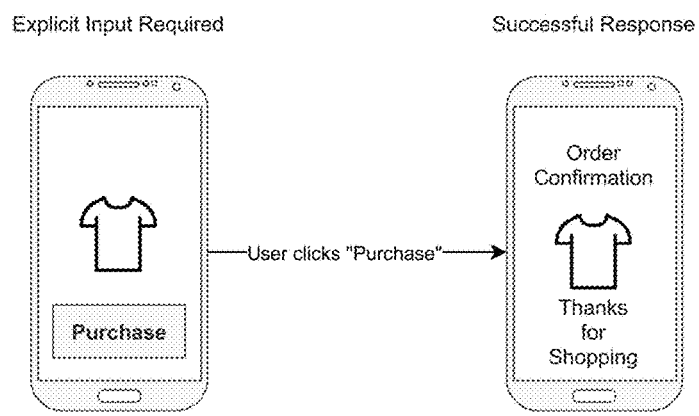
FIG. 17 is a drawing depicting an example of an explicit input in an ecommerce context.
Figure 18:
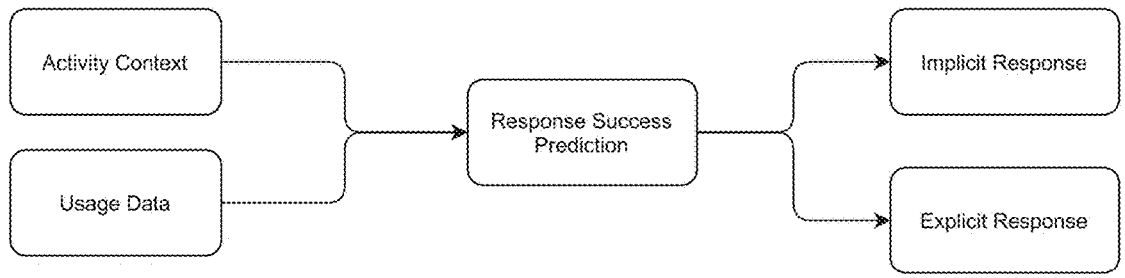
FIG. 18 is a drawing depicting an embodiment of the Response Analyzer.

In an embodiment, shown in FIG. 18, a response analyzer works to predict the success of users' responses when they engage with the target device(s). For example, a problem is when users are static—or show very little body movement—it is often unclear on how to evaluate the success of their actions when engaging with interfaces. For example, as shown in FIG. 17, an ecommerce retailer that allows users to purchase products from a website may design its user interface so that the user interface would yield the highest purchase activity. The success of the user's actions is defined as and directly related to the user's propensity to make a purchase. This success metric is pre-designated to evaluate the user response that yields the highest purchase activity. In such settings, it is known that the user engaging with the website is required to provide an explicit response to the interface so that a purchase can be made. For example, the indication that a user has made a purchase is if they successfully arrive at the 'Order Confirmation' screen that confirms the user's purchase.

Explicit responses by a user to perform an action is not limited to tapping on a mobile device or clicking on a button on an interface. Anytime a user is performing an action with the expectation that the interface can receive and understand the action can be defined as an explicit response. Examples of such explicit responses are: tapping a button on a mobile device, clicking a button on a desktop computer, providing voice instructions to a Voice Assistant interface, and performing a known gesture in an XR interface.

When users are engaging with interfaces while they are in motion and cannot provide explicit responses to interfaces, the evaluation of the success of the user's actions becomes unclear or more difficult to interpret. In these settings, success of a user's actions for a given interface presented is often provided by implicit responses by users. Implicit responses are actions performed by users without the expectation or knowledge that the interface receives the actions. Examples of implicit responses are: glancing at an on-screen notification that subsides shortly on a mobile device, checking the time on a smartwatch, and, a user rotating his or her head to acknowledge a component of a XR interface while equipped with a headset. The Response Analyzer serves to predict the success of the users' responses when they engage with the target device(s).

Figure 19:
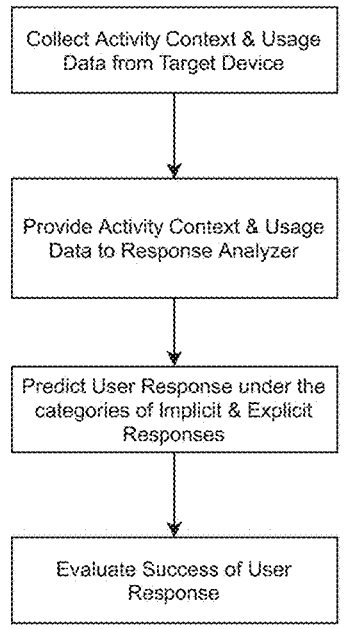
FIG. 19 is a flowchart depicting an embodiment of the Response Analyzer.

In an embodiment, as shown in FIG. 19, the steps involving the response analyzer are: Collecting Activity Context and Usage Data from Target Device, Providing Activity Context and Usage Data to Response Analyzer, Predicting User Response under the categories of Implicit and Explicit Responses, and Evaluating Success of User Response.

For the step of collecting Activity Context and usage data from the target device, two inputs for the Response Analyzer are gathered when a user engages with the target device: the Activity Context at that point in time and the Usage data originating from the target device. The Activity Context of the user is predicted by the Context Analyzer, which takes in the motion data from the target device(s) for a fixed period of time. Usage Data, as defined previously, refers to data relating to the use of the target device(s). Usage Data may include the following: Actions performed such as mouse movements, clicks, taps, etc.; Session & application data such as type of program, screens/pages viewed, length of time on a page, time of day, etc.; and/or User data such as age, gender, occupation, etc.

Figure 20:
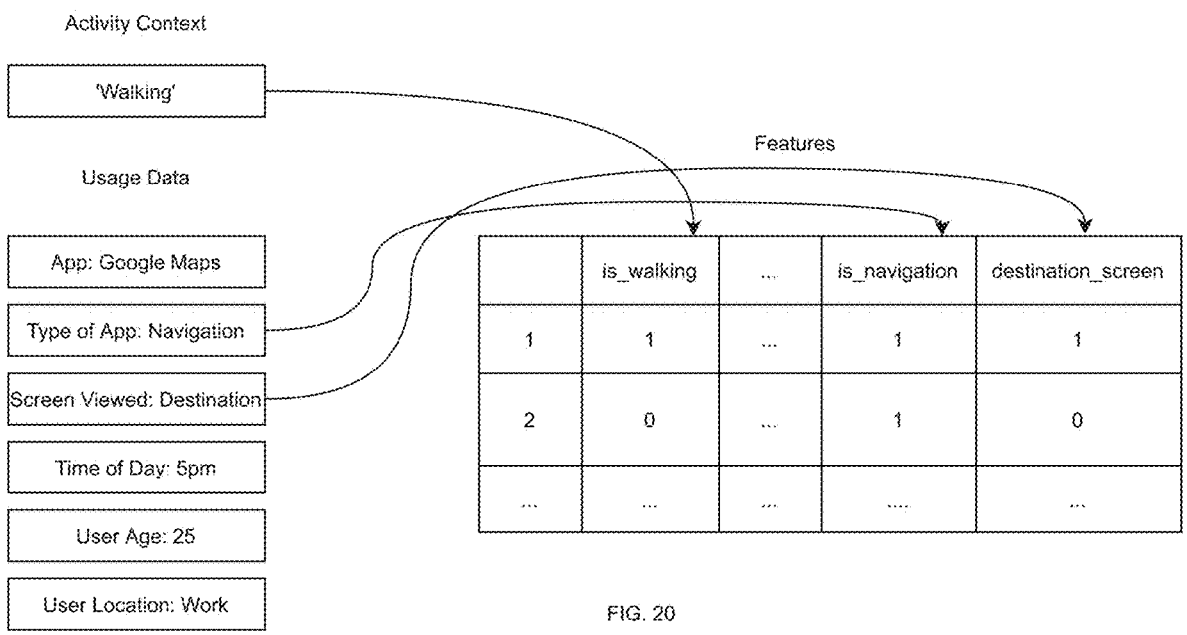
FIG. 20 is a drawing depicting an example of the transformation of Activity Context and Usage Data for the Response Analyzer.

For the step of providing Activity Context and usage data to the response analyzer, the Activity Context and Usage Data are transformed in order to be properly consumed by the Response Analyzer. The data gathered for both the Activity Context and Usage Data are transformed into features, or an abstracted representation of the data, so that the ML model in the Response Analyzer can take in the data to make a prediction. FIG. 20 shows how Activity Context and Usage Data attributes are transformed into a format that is consumable by the Response Analyzer through a process of called 'one-hot encoding' (OHE). OHE is one of the ways in which categorical and attribute data are transformed. Numerical attributes also undergo transformation using a variety of other ways. OHE is a preferred encoding because it treats each category independent of others, and is functional for these use cases. Other types of encoding may include: Sum Encoding, Label Encoding, and/or Target Encoding.

For the step of predicting user response under implicit and/or explicit categories, the Response Analyzer is a machine learning model that predicts the response that the user will provide to the interface based on the Activity Context and Usage Data. The underlying algorithm for predicting the response is probabilistic, and in an embodiment, the Response Analyzer is designed to predict the response instead of giving a % for the predicted response. These user responses fall under two categories: implicit and explicit responses. Examples of implicit responses to an interface include: Glancing, gazing or looking at a specific area of the interface, whether it's physical or XR; Moving or repositioning the device within proximity of the user (i.e. flipping a mobile phone, placing the mobile phone from the armband to a pocket, etc); and, Any spatial body movements performed by the user that is not explicitly directed as instructions to the interface. Examples of explicit responses include: Clicking or tapping a button on a physical screen; Performing a gesture to be recognized by the XR interface; Submitting a form on a desktop website; Instructing a Voice Assistant to dial contact's number; and, Completing a purchase on a web store.

Figure 21:
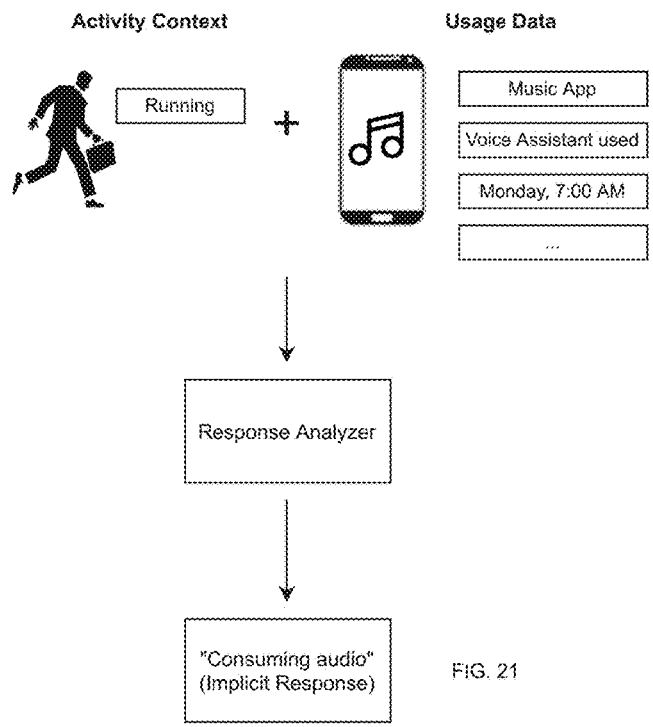
FIG. 21 is a drawing depicting an example output of the Response Analyzer.

FIG. 21 shows an example of an output produced by the response analyzer for an individual that is performing the "running" Activity Context paired with Usage Data of "music app, voice assistant used, and Monday at 7 am". The features transformed from the Activity Context with the Usage data allows the Response Analyzer to predict how the user will respond to the Music application interface during the above engagement. In this setting, the Response Analyzer was able to predict that the response the user will provide, given that the user is running and engaging in a specific set of ways with a Music application, is to listen to music (implicit response).

Figure 22:
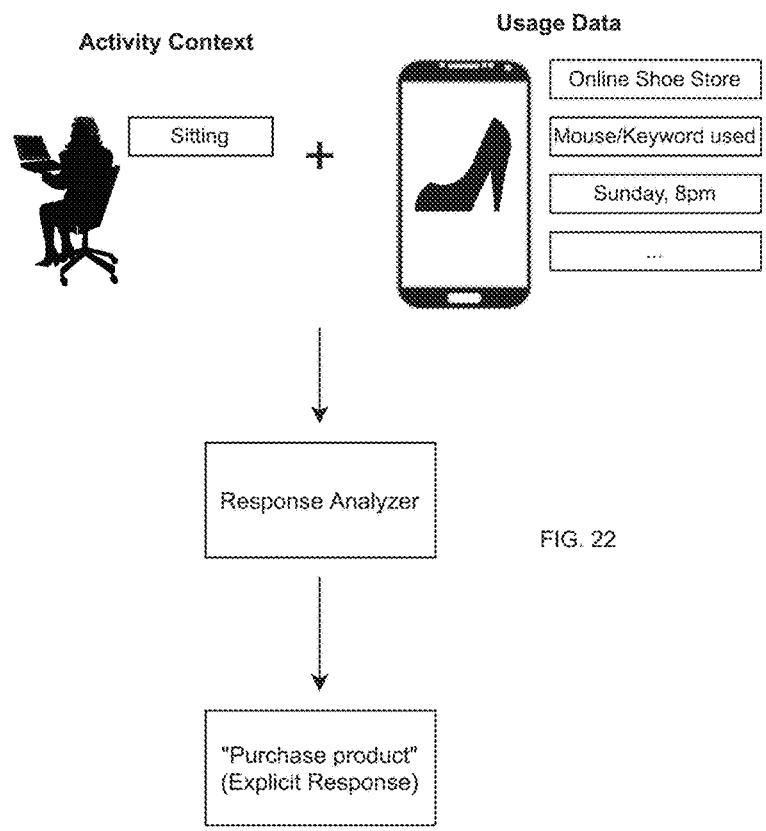
FIG. 22 is a drawing depicting another example output of the Response Analyzer.

FIG. 22 shows another example where an explicit "Purchase" response is predicted by the Response Analyzer for an individual engaging with an Online Shoe Website while the Activity Context is "sitting".

Figure 23:
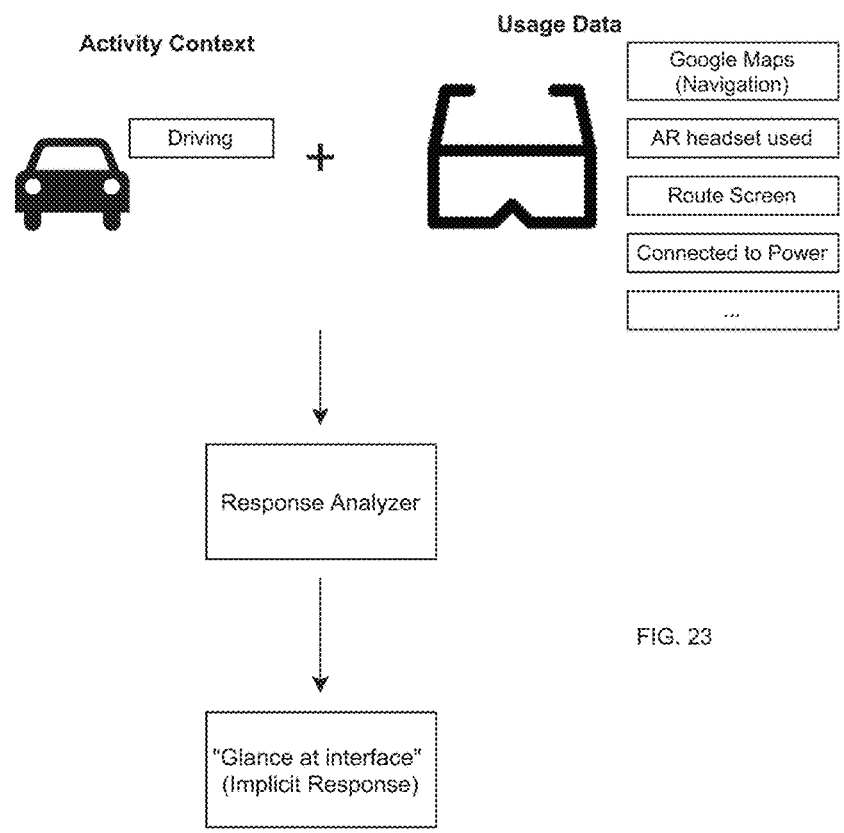
FIG. 23 is a drawing depicting another example output of the Response Analyzer.

FIG. 23 shows another example where an Augmented Reality headset is used as a medium for an interface with the Response Analyzer. The Activity Context for the user predicted is "driving" and when paired with Usage Data produced by the application used with the augmented reality (AR) interface (user is using a navigation map, on the route screen and connected to a power outlet), the Response Analyzer is able to predict the implicit response that the user will perform is "glance at the interface". A user engaging with the same application such as Google Maps on an AR interface and mobile device may have the same responses such as "glance at interface" (implicit response) or "tap on Set Route button" (explicit response). However, the prediction of such responses by the Response Analyzer requires specific underlying machine learning models for each interface. The AR interface has its own trained machine learning model to predict responses when users use Google Maps with an AR interface. And, a different machine learning model is used to predict responses when users use Google Maps with a mobile device.

Figure 24:
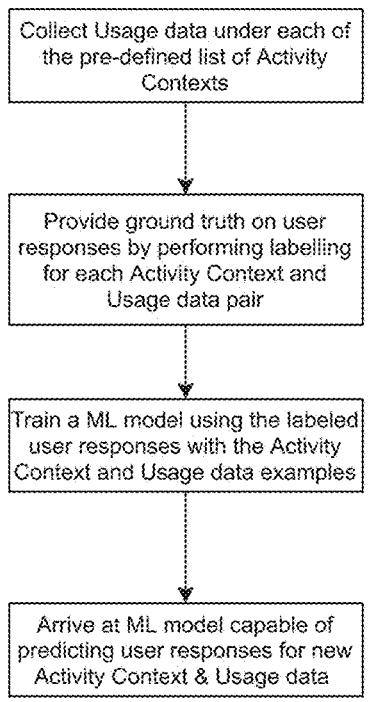
FIG. 24 is a flowchart depicting an embodiment of the steps for training the Response Analyzer.

The way the Response Analyzer is able to make such predictions is due to the training of the underlying ML model based on historical examples. Each pair of application and interface requires its own set of predetermined user responses that are trained for predicting how the user will engage with the interface. In an embodiment, FIG. 24 shows the steps required to arrive at a trained Response Analyzer. The steps are: Collecting Usage data under each of the pre-defined list of Activity Contexts, Providing ground truth on user responses by performing labelling for each Activity Context and Usage data pair, Training a ML model using the labeled user responses with the Activity Context and Usage data examples, and, Creating a ML model capable of predicting user responses for new Activity Context and Usage data. In another embodiment, the Response Analyzer may contain one or a set of machine learning models in order to make accurate predictions for the user responses for each different type of interface.

Figure 25:
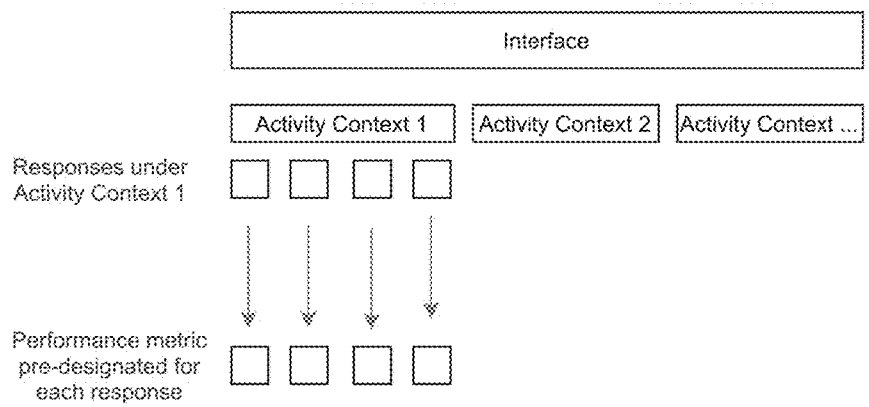
FIG. 25 is a drawing depicting an example of a Response, a Performance Metric, and a direction for improving the Performance Metric for an Activity Context.

In an embodiment, there is the step of evaluating the success of a user response. Referring now to FIG. 25, once the Response Analyzer outputs a user response, a performance metric, and a direction for improving the metric are associated with the specific response. These metrics are quantitative indicators that assess the successfulness of a given response. These metrics are predetermined on a one-to-one basis for each available response for a given Activity Context and Interface (an interface here refers to the combination of the physical target device and the application used). Thus, for a given response, there can be one or more metrics, each metric with a direction that evaluates its success. The association of specific predetermined performance metrics to specific user responses is completed independently of the training. Each of the collection of predicted user responses for a given user interface is assigned one or more predetermined performance metrics.

Examples of performance metrics for various explicit responses for users include: Increasing and/or Decreasing the clickthrough or engagement rate of a call-to-action button for a particular screen of a physical or virtual interface; Increasing the conversion rate of making a purchase for a particular ecommerce store, whether through a physical or virtual interface; Decreasing the frequency of repetitions for a particular voice instruction to a voice interface; and, Decreasing the time elapsed for performing gestures for one instruction to a XR interface. For example, consider a user engaging with a particular ecommerce store on a mobile device interface. The Activity Context and Usage data collected predicts that the user response for such an engagement is to 'make a purchase'. It is then predetermined that the response will be evaluated with the performance metric of a conversion rate that measures whether the user makes a purchase during this engagement with the ecommerce store. An increase to the conversion rate is associated with an increase in the success metric for this setting.

Examples of performance metrics for various implicit responses for users include: Decreasing the response time for a user to locate a particular area on an interface as measured by retinal sensors; Increasing and/or Decreasing the speed and angle at which a user tilts his or her head to implicitly acknowledge a change in the interface; Increasing and/or Decreasing the time spent by a user on a particular screen or page of an interface; and, Decreasing the number or amount of unrecognized body movements performed by a user. For example, if the outputted response from the Response Analyzer is "glance at phone" for a user under the Activity Context driving and is using the navigation related program or application then the performance metric that is associated with evaluating such a response is the time elapsed while the user is looking at the interface. The direction is to decrease the performance metric (limit the time elapsed for the user looking at the phone). In this setting, it is required that the target device which provides the interface for the user has the sensor hardware to be able to measure and produce the performance metric needed to evaluate the response.

Figure 26:
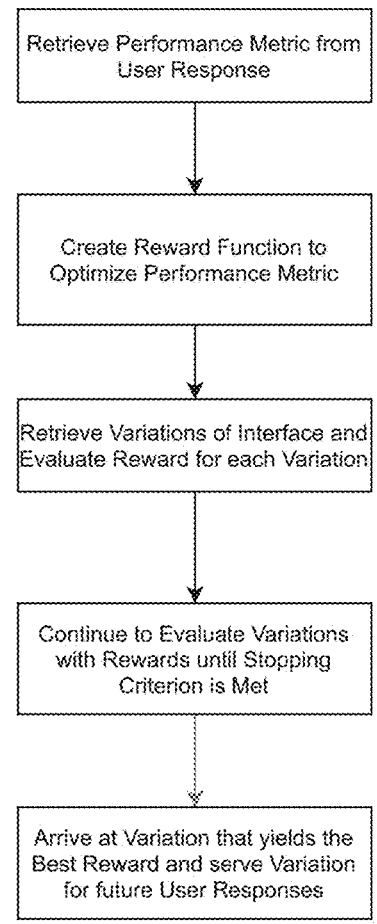
FIG. 26 is a flowchart depicting an embodiment of the steps for the Testing Model.

In an embodiment, the Testing Model is a Reinforcement Learning model that serves to learn the best variation for a particular interface for a given user response. Referring now to FIG. 26, it consists of the following set of steps: Retrieving Performance Metric from User Response, Creating Reward Function to Optimize Performance Metric, Retrieving Variations of Interface and Evaluating Reward for each Variation, Continuing to Evaluate Variations with Rewards until Stopping Criterion is Met, and, Arriving at Variation that yields the Best Reward and serving the Variation for future User Responses. The Testing Model may also be referred to as the ML Experimentation Model.

A test is conducted for when a user response is provided by the Activity Context that requires determination of the best variation of interface to serve the response. An interface is defined as any medium that is capable of receiving engagement with users. For example, an application or a mobile application consists of pages or screens in which users can interact with. Each page or screen for the application may be considered as a singular interface. Alternatively, each page or screen for the application may be considered as separate individual interfaces. Additional examples of interfaces include: A particular virtual screen engaged by users using a XR headset; A particular voice prompt that a user needs to provide a response for a Voice Assistant; and, A particular field of view that includes the collective physical view of the real world and visual components overlayed for an AR application.

A variation represents an interface that is derived from a default interface but consists of different components from the default interface, as well as any other variations. A component refers to a sub-portion or subset of a particular variation or interface. The combination of all components for a particular variation is uniquely different from any other interface (no two variations can contain the same components). Each interface has its own set of components. Examples of components for various interfaces include: A product image for the product screen for a mobile ecommerce application; A virtual speedometer for a screen for an AR car navigation application; A phrase within a sentence outputted by a Voice application; and, A virtual button that exist on a virtual screen in a XR application.

Figure 27:
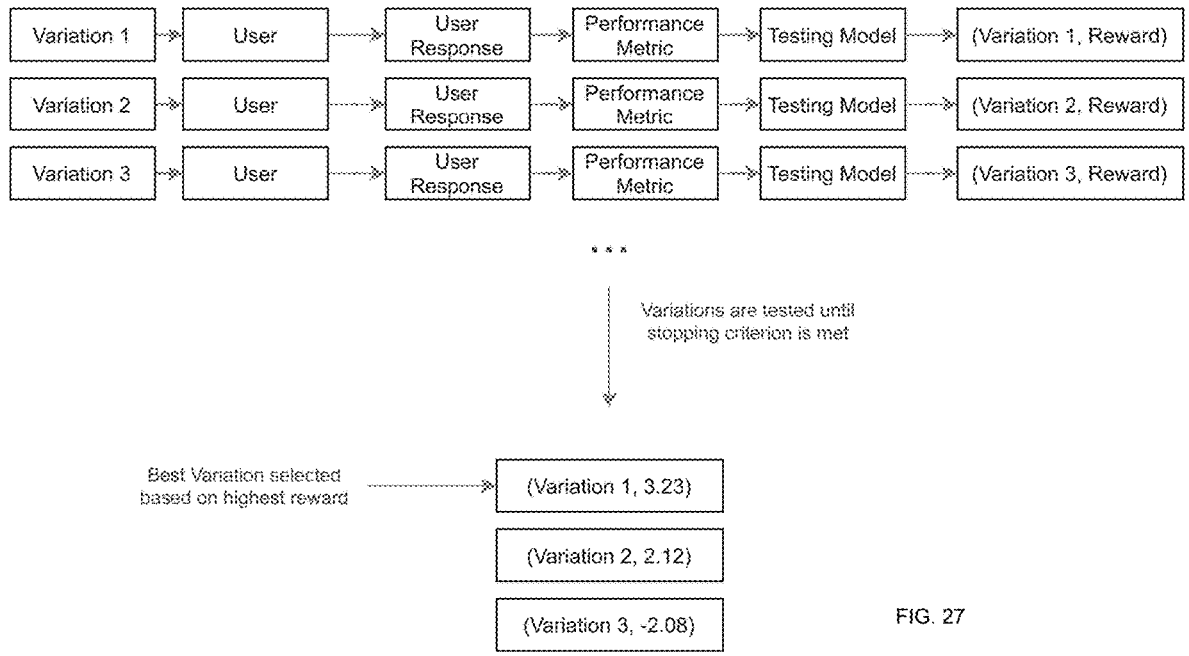
FIG. 27 is a drawing depicting an example of a reward function that is used to evaluate the results of the Performance Metric.

Referring now to FIG. 27, once a performance metric is retrieved from the Response Analyzer, a reward function is used to evaluate the result of the metric. When provided with a variation of an interface, the user will produce a performance metric that is associated with the response. The performance metric is then inputted into the reward function and a specific quantitative measure is outputted that indicates whether the exposure of the variation to the user is positive or negative, as well as a magnitude that describes the degree of the positive or negative reward. Positive rewards are favourable outcomes and negative rewards are unfavourable outcomes. As more instances of variations are exposed to the user—for a given response—the Testing Model will produce rewards for each instance, and an inventory containing pairs of (Variation, Reward) is created. The reward itself has no interpretable meaning aside from describing the variation as favourable or unfavourable, but rather the Testing Model utilizes this value in order to adjust the variation so that the next instance exposed to the user, the reward produced is higher than previously.

A stopping criterion is applied to denote the end of the use of the Testing Model. In this example, the stopping criterion is a predetermined number of instances in which the Testing Model has evaluated. Another example of stopping criterion may be reaching a predetermined threshold for Reward for a particular variation. Once the stopping criterion is reached, the variation associated with the highest reward is deemed as the best variation for the given user response. When the user response is predicted in the future again, this best variation is directly presented to the user to meet the response, and the Testing Model is bypassed.

For example, consider the arrival of a predicted user response from the example shown in FIG. 23, given the Activity Context and Usage data, the Response Analyzer has predicted that the user will respond to the AR interface by glancing at it. The performance metric that is determined to evaluate with the user response is the time elapsed for the user glancing at the interface. It has been predetermined that it is favourable for the user to minimize this metric for this response. Based upon the provided performance metric, a reward function is created that takes in metric values and outputs reward values so that the Testing Model is capable of evaluating. The Testing Model then retrieves the relevant set of variations for the interface being engaged.

Figure 28:
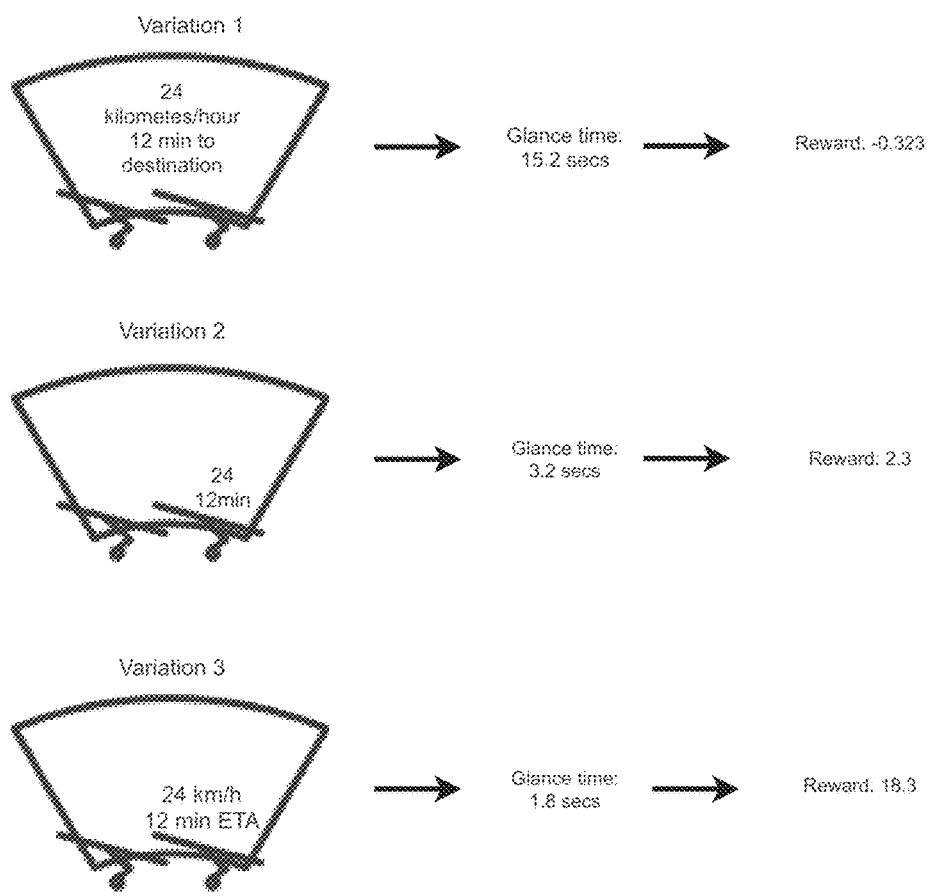
FIG. 28 is a drawing depicting an example of user interface variations shown to a user.

Continuing the above example, variations of the Route Screen are retrieved as the user response predicted is associated with that specific screen. FIG. 28 shows 3 instances of 3 different variations shown to the user, to meet the predicted user response. Each variation represents the Route Screen interface in which the user engages with to retrieve navigational information while driving. Each variation represents an AR interface overlayed onto the windshield of the car. The components of this interface include the travelling speed and the time to destination or estimated time to arrival (ETA). Each variation is unique as all three are made of different components. Each variation is presented to the user and the performance metric of 'glance time' is evaluated after exposure of each variation. A performance metric value is produced for each variation and subsequently passed to the Reward Function so that the Testing Model can evaluate the success of such variation. After the 3rd exposure, the stopping criterion is met. Based on all variations presented to the user, Variation 3 yields the highest reward and thus it is deemed the best variation.

Figure 29:
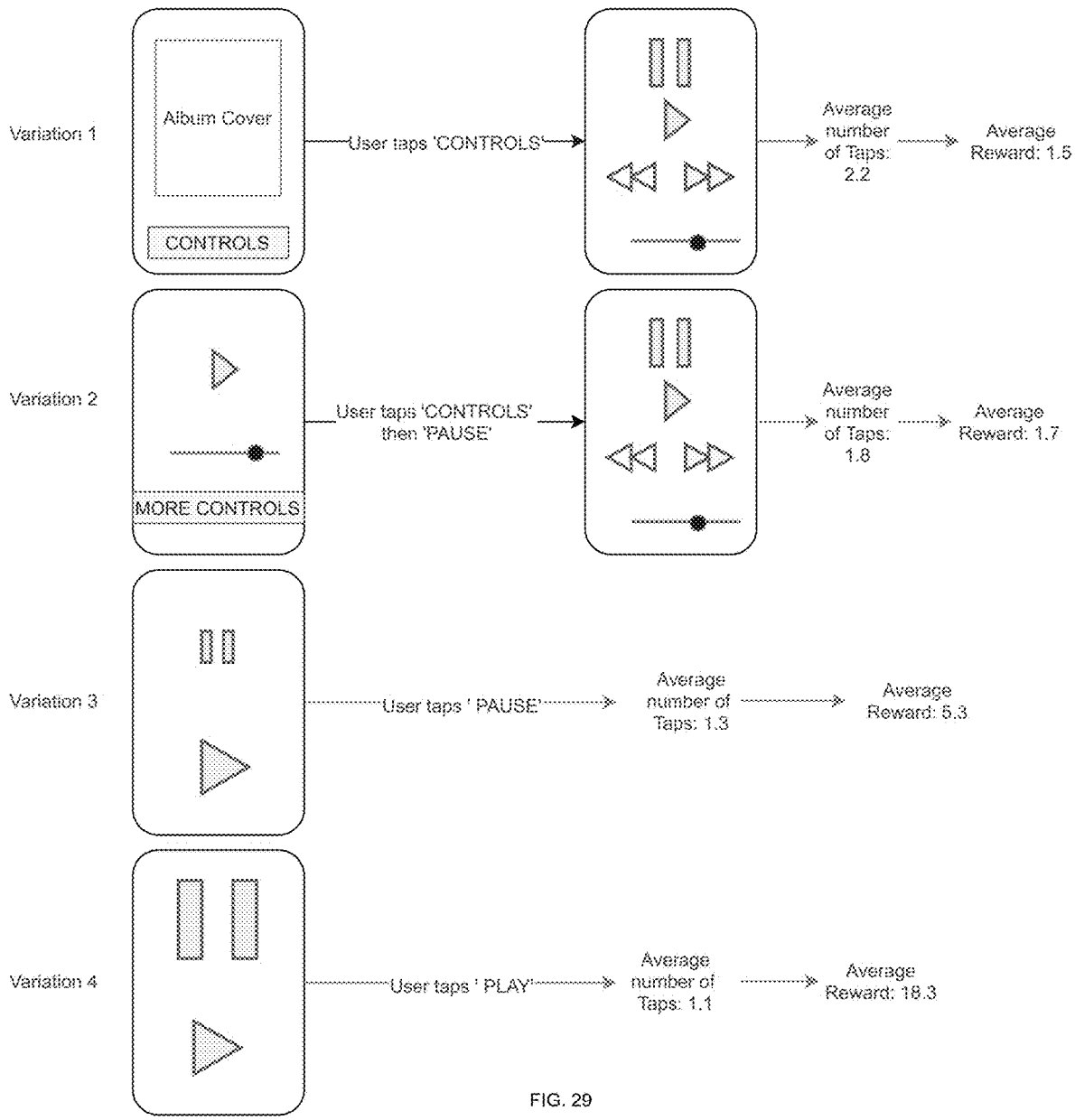
FIG. 29 is a drawing depicting another example of user interface variations shown to a user.

In another example, as shown in FIG. 29, consider a user engaging with a mobile navigation application while performing the Activity Context "driving". The Response Analyzer then predicts the explicit response "tap on button" and minimizing the metric for the number of taps on the interface is associated with such response. In this test, four variations are exposed to the user for the given response. The user's actual intentions are to press the 'Pause' & 'Play' buttons while 'driving' however the Testing Model is not aware of the user's intention nor does it attempt to predict it. The average number of taps and average reward are reported in FIG. 28 as illustrations to provide an explanation of how the Testing Model evaluates rewards for each Variation presented to the user.

Of all instances of Variation 1 presented to the user, the user performs on average 2.2 taps as an explicit user response. FIG. 28 also shows the motivation as to why the user takes on average 2.2 taps as he or she needs to navigate on two different screens, resulting in 2 taps needed to achieve the 'pause' or 'play' button. However, the Testing Model is only aware that the user registers on average 2.2 taps and the average reward resulted from each instance presented is 1.5. In Variation 2, the volume slider and the 'play' component is exposed to the interface. The average number of taps over the testing period is lower than Variation 1 due to the fact that when the user needs to respond by pressing 'PLAY', there is no need to perform any more taps as the 'PLAY' button is now presented in the current screen. The average reward is higher than Variation 1. In Variation 3, both components are now presented to the interface, the Testing Model registers an average number of taps of 1.3 and a corresponding reward. Variation 4 differs from Variation 3 in that the 'PAUSE' button is presented as a larger component than the 'PLAY' button. This variation results in the lowest average number of taps the user registers and thus the highest reward. Variation 4 is then chosen as the variation to present to the user during the next predicted user response.

In an embodiment, there are two types of machine learning systems used in the present disclosure: supervised learning, and reinforcement learning.

In an embodiment, the Context Analyzer and Response Analyzer are supervised machine learning systems where there is ground truth or labels applied in the data that is used to train the models. The input for the method and system is historical data in the form of motion data and the output is an Activity Context based on a predetermined list of choices. The underlying algorithms that the Context Analyzer and Goal Analyzer use are classification algorithms that predict one discrete output based on a predetermined number of output choices. These algorithms can include both traditional machine learning algorithms and deep learning algorithms. Examples of traditional machine learning algorithms include Logistic Regression, Support Vector Machines, Naive Bayes, etc where representations of the raw data need to be manually extracted as 'features' in order to be inputted into the algorithm for a prediction. Deep learning systems are capable of learning automatically of the necessary representations of data that is required to be produced in order for the algorithm to make predictions. Unlike traditional machine learning systems, there is little need to manually extract 'features' or data presentations. Examples of deep learning algorithms include Convolutional Neural Networks, Recurrent Neural Networks, Long-Short Term Memory Neural Networks, etc.

Figure 30:
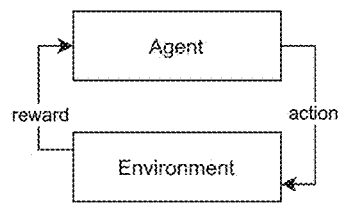
FIG. 30 is a drawing depicting an example of reinforcement learning.

The second type of machine learning system used is Reinforcement Learning. As shown in FIG. 30, this system consists of three parts: an agent, an environment and a reward. For a given Environment, the Agent will go through trial-and-error of actions, determining the best action to take in order to maximize its Reward. The Testing Model uses this type of machine learning system in order to learn the sequence of decisions it needs to make in order to maximize the performance of an user response. The Agent in this case is the Testing Model taking actions that expose different variations of components to an interface engaged by an user, which collectively form the Environment. The Reward is a metric derived to measure the performance of the user response. Based on the user response to the Testing Model's choice of variation exposed, a quantifiable reward is calculated that allows the Testing Model to evaluate its performance with the variation it chose for the given environment, and provides information on how to change its next action in order to maximize the reward.

In another embodiment, as shown in FIG. 31 using a client device as shown in FIG. 1A, Context Data may be collected to both train the ML model and to make predictions on Activity Contexts. Context Data includes both Motion Data and Vision Data. Examples of Vision Data include: Images or videos of the environment captured through a camera device 114; and/or Images or videos of the user captured through a camera device 114. The Vision Data may be from XR hardware and/or systems. XR hardware and/or systems are those for enabling augmented reality (AR), virtual reality (VR), and/or mediated reality (MR). The steps as shown in FIG. 31 are: Collect Context Data that describe various Activity Contexts from sensors in target device(s), Train ML model to create associations between Context Data and respective Activity Contexts, Collect Usage Data and various User Responses for each Activity Context for a given interface, Train ML model to create associations between Usage Data and User Responses for each relevant Activity Context, Predict Activity Contexts for new Context Data from target device(s), Predict User Responses based on new Usage Data and the newly predicted Activity Contexts, Associate predetermined Performance Metric with Predicted User Response, For a given interface, expose Variations of the default interface to the user and evaluate Performance Metric, Evaluate Reward from Performance Metric to provide feedback on each instance of variation exposed to user, Continue exposing variations to users for a given interface until Stopping Criterion is met, and Serve variation with highest Reward to the user for the same future User Responses.

The end-to-end approach follows the same sequential structure as the approach with the use of Motion Data starting from the collection of data for offline training the Context Analyzer, to the online prediction of user responses with the Response Analyzer and the employment of the Testing Model to serve the best variation of the interface to the user. The approach with the use of Context Data differs from the approach with the use of Motion Data in 3 key steps. In the first step, Context Data that describes various Activity Contexts are collected as ground truth labels for offline training of the Context Analyzer. The Context Analyzer makes use of both Vision Data and Motion Data to predict the Activity Context. During the step of making predictions of Activity Context with new data, Context Data—inclusive of both Vision Data and Motion Data—is required from the target devices.

In the following example shown in FIG. 32, both Vision Data and Motion Data are captured as Context Data and processed and inputted into the Context Analyzer to predict the Activity Context for a given period of time. The offline training of the Context Analyzer now follows these steps: Collect Vision & Motion Data (Context Data) for various activity contexts, Train ML model to create associations between Context Data and Activity Contexts, and, Use model to predict Activity Context for new motion data.

Prior to the application of the ML Training Pipeline, information from both raw Motion and Vision Data are extracted. The steps are shown in FIG. 33: Preprocess Motion Data & Vision Data, Extract Features from Motion Data & Objects from Vision Data, Apply Machine Learning Training Pipeline, and, Arrive at ML Model Capable of Predicting Activity Context on New Context Data. The extraction of features from Motion Data are detailed above and as shown in FIG. 11. Once Vision Data is captured from a camera device, the data is inputted through a Machine Vision System 116 (MVS) where physical objects that are present in the Vision Data are detected and extracted. The detected objects are then encoded as features and synchronized in timesteps with the features extracted from Motion Data and subsequently trained with a Supervised Machine Learning model to create associations between the collective features and the ground truth label (Activity Context).

Figure 34:
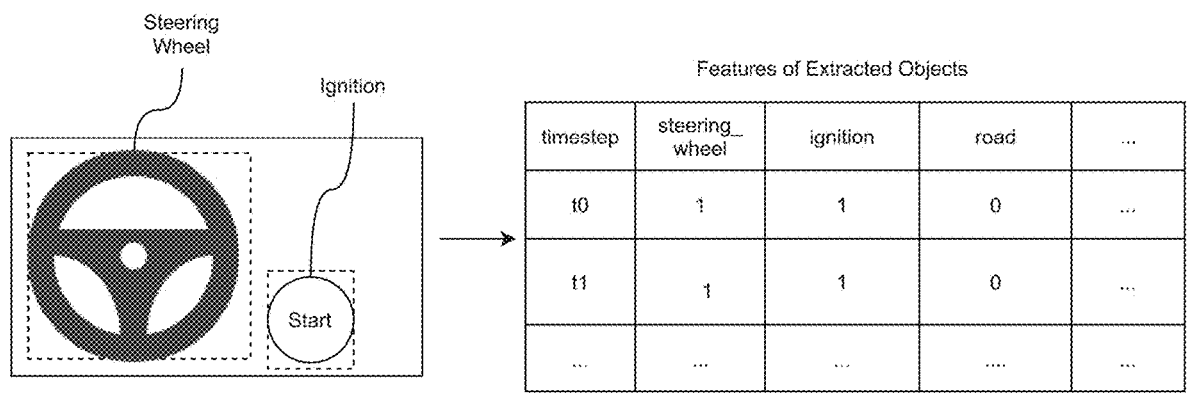
FIG. 34 is a drawing depicting an example of feature extraction from the Machine Vision System.

FIG. 34 provides insight on how features are created based on the extracted objects from the MVS. The MVS encodes the features through a process of 'One-Hot Encoding', where objects take on a value of '1' if present in the image or video capture and '0' if not present. These features from the Vision Data are then combined with the features extracted from the Motion Data to train the Context Analyzer in the offline phase.

Figure 35:
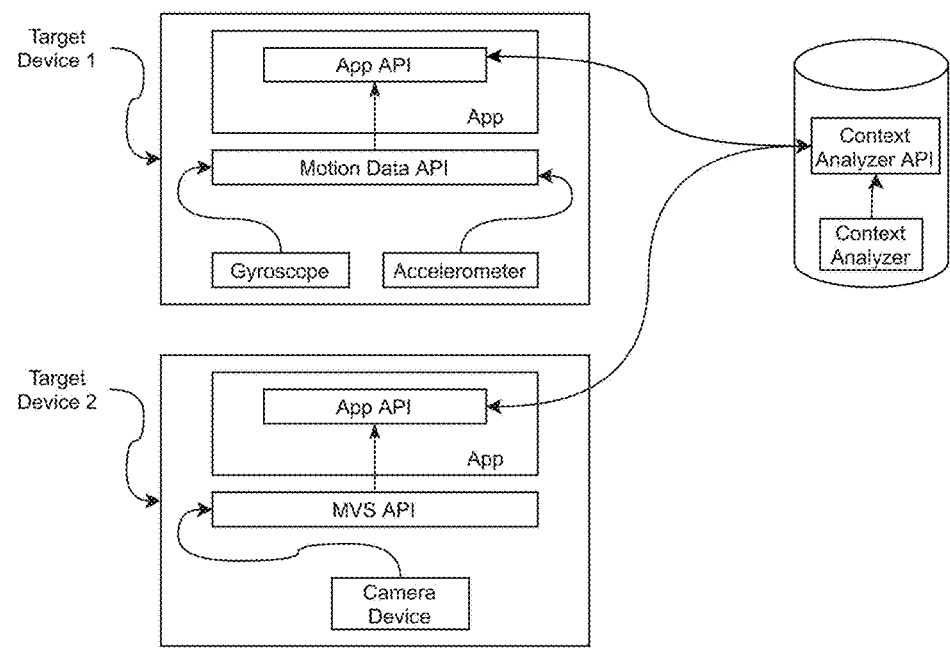
FIG. 35 is a drawing depicting an example of the Context Analyzer making predictions based on Motion Data and Vision Data.

Once the Context Analyzer is trained and is ready to make online predictions on new Motion Data and Vision Data, the architecture shown in FIG. 35 describes how new data is processed and inputted into the trained Context Analyzer for predictions. The example shows two target devices 1) a target device supplying features of Motion Data to the Motion Data API, which then gets passed through the App API and onto the Context Analyzer API for the motion portion of required information; and 2) a second target device supplying features of Vision Data to the MVS API, which then gets passed through the App API and onto the Context Analyzer API for the vision portion of the required information.

Figure 36:
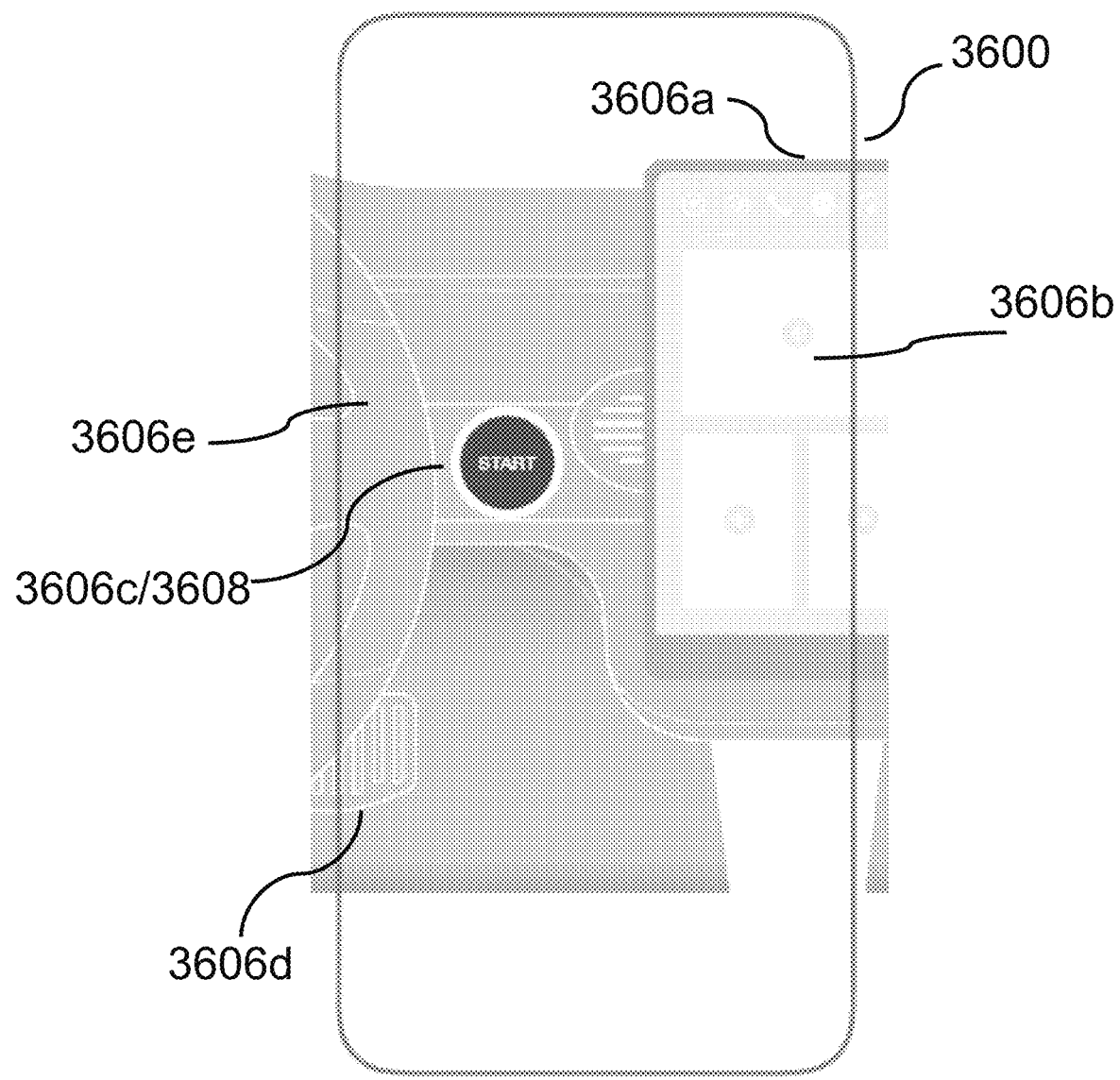
FIG. 36 is a drawing depicting an augmented reality example.

The example shown in FIG. 36 is a variation of the AR interface exposed to a user for the predicted Activity Context "Sitting in car", which is predicted with both Vision Data and Motion Data for an Augmented Reality Interface. The detected objects captured through the smartphone's camera device and predicted by the MVS are: 3606*a*—In-car Navigation System, 3606*b*—Route Screen for Navigation App in Navigation System, 3606*c*—Key Ignition, 3606*d*—Car Gas Pedal, and 3606*e*—Steering Wheel. Additionally, these detected objects are encoded as features by the MVS API and inputted into the Context Analyzer. Objects not detected, and therefore, not shown in the figure can include: Person, Another Car, Road, Stop Sign, and, Traffic Light. Furthermore, Motion Data is captured by the smartphone's gyroscope and accelerometer. The motion sensor devices capture the standstill nature of the car in the form of axial signals, which is processed and transformed into features and inputted into the Context Analyzer. The Context Analyzer then predicts the Activity Context "Sitting in car" given the features from both the Motion and Vision Data that describe the car is stationary and the objects in view. The predicted Activity Context is then used in conjunction with the Usage Data originating from the AR app on the smartphone to predict the user response "Hit Start on Ignition". The variation that is exposed to the user prominently reveals the "Start" button 3608 on the ignition 3606*c*, as captured through the AR interface 3600.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the concepts disclosed herein may be embodied as a non-transitory computer-readable medium (or multiple computer-readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the present disclosure discussed above. The computer-readable medium or media can be transportable, such that the program or programs stored thereon can be loaded onto one or more different computers or other processors to implement various aspects of the present disclosure as discussed above.

The terms "program" or "software" are used herein to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various features and aspects of the present disclosure may be used alone, in any combination of two or more, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the concepts disclosed herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

This written description uses examples to disclose the invention and also to enable any person skilled in the art to make and use the invention. The patentable scope of the invention is defined by the claims, and may include other examples that occur to those skilled in the art. Such other examples are within the scope of the claims if they have structural elements that do not differ from the literal language of the claims, or if they include equivalent structural elements with insubstantial differences from the literal language of the claims.

It may be appreciated that the assemblies and modules described above may be connected with each other as required to perform desired functions and tasks within the scope of persons of skill in the art to make such combinations and permutations without having to describe each and every one in explicit terms. There is no particular assembly or component that may be superior to any of the equivalents available to the person skilled in the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for this document, that the phrase "includes" is equivalent to the word "comprising." The foregoing has outlined the non-limiting embodiments (examples). The description is made for particular non-limiting embodiments (examples). It is understood that the non-limiting embodiments are merely illustrative as examples.

What is claimed is:

1. A method, comprising:
    training a context analyzer machine learning model executing on one ore more computers with training motion data for a training activity context, the context analyzer for predicting a predicted activity context from new motion data, wherein the predicted activity context characterizes a particular kinetic state of a user;
    training a response analyzer machine learning model executing on the one or more computers with training usage data and training user responses for the training activity context for a user interface, the response analyzer for predicting a predicted user response from the predicted activity context and new usage data;
    inputting motion data received from sensors proximate to a user that characterizes an angular velocity and a linear acceleration of the user into the context analyzer to determine an activity context of the user;
    inputting the activity context of the user into the response analyzer to determine a predicted user response;
    inputting the predicted user response and the activity context of the user into a machine learning system executing on the one or more computers and the machine learning system selects a user interface from a plurality of user interfaces based on the predicted user response, wherein:
        a first user interface of the plurality of user interfaces has call to action (CTA) components for a set of user intentions for executing operations of a particular software application;
        a second user interface of the plurality of user interfaces has CTA components for a first subset of user intensions selected from the set of user intentions for executing operations of the particular software application, the first subset of user intentions excluding at least one user intention in the set of user intentions; and
        a third user interface of the plurality of user interface has CTA components for a second subset of the set of user intentions for executing operations of the particular software application, the second subset of user intentions excluding at least one user intention in the set of user intentions, and the second subset of user intentions being different than the first subset of user intentions, wherein:
            the machine learning system selects the second user interface of the plurality of user interfaces in response to the activity context of the user indicating that the user is experiencing a bumpy motion, and the user has a pace that meets a first threshold; and
            the machine learning system selects the third user interface of the plurality of user interfaces in response to the activity context of the user indicating that the user has a pace that meets a second threshold that is greater than the first threshold; and
    outputting the selected user interface for the user on a user device.

2. The method of claim 1, wherein, the training motion data and the motion data are collected from at least 2 sensors, and the at least 2 sensors are for measuring the motion of different parts of the user's body.

3. The method of claim 1, wherein, the training motion data and the motion data are collected from at least 2 sensors, and the at least 2 sensors are for measuring the motion of the user's body and the motion of the user's environment.

4. The method of claim 1, wherein, the step of training a context analyzer machine learning model, further comprises:
    collecting the training motion data for the training activity context from a sensor for measuring movement of the user's body; and
    training the context analyzer machine learning model with the training motion data for the training activity context.

5. The method of claim 1, wherein, the step of training a response analyzer machine learning model, further comprises:

collecting the training usage data and the training user responses for the training activity context for the user interface; and training the response analyzer machine learning model with the training usage data and the training user responses for the training activity context for the user interface.

6. The method of claim 1, wherein the predicted user response is further based on usage data.

7. The method of claim 1, further comprising, associating a predetermined performance metric with the predicted user response.

8. A non-transitory computer readable medium, configured to perform the method steps of claim 1.

9. The method of claim 1, wherein the machine learning system modifies the second user interface and the third user interface of the plurality of user interfaces to reduce the size of components in the second user interface and the third user interface of the plurality of user interfaces that are not CTA components.

10. The method of claim 1, further comprising:

periodically repeating the inputting of the motion data received from the sensors proximate to the user into the context analyzer to update the activity context of the user; and repeating the inputting of the activity context of the user into the response analyzer to update the predicated user response responsive to a change in the activity context of the user;

repeating the inputting of the predicted user response to the machine learning system responsive to a change in the predicted user response.

11. A system, comprising:

a memory;

a processor, operatively connected to the memory, the processor configured to:

train a context analyzer machine learning model with training motion data for a training activity context, the context analyzer for predicting a predicted activity context from new motion data, wherein the predicted activity context characterizes a particular activity context of a user;

train a response analyzer machine learning model with training usage data and training user responses for the training activity context for a user interface, the response analyzer for predicting a predicted user response from the predicted activity context and new usage data;

input motion data received from sensors proximate to a user that characterizes an angular velocity and a linear acceleration of the user into the context analyzer to determine an activity context of the user;

input the activity context of the user into the response analyzer to determine a predicted user response;

input the predicted user response and the activity context of the user into a machine learning system and the machine learning system selects a user interface from a plurality of user interfaces based on the predicted user response, wherein:

a first user interface of the plurality of user interfaces has call to action (CTA) components for a set of user intentions for executing operations of a particular software application;

a second user interface of the plurality of user interfaces has CTA components for a first subset of user intensions selected from the set of user intentions for executing operations of the particular software application, the first subset of user intentions excluding at least one user intention in the set of user intentions; and a third user interface of the plurality of user interface has CTA components a second subset of the set of user intentions for executing operations of the particular software application, the second subset of user intentions excluding at least one user intention in the set of user intentions, and the second subset of user intentions being different than the first subset of user intentions, wherein:

the machine learning system selects the second user interface of the plurality of user interfaces in response to the activity context of the user indicating that the user is experiencing a bumpy motion, and the user has a pace that meets a first threshold; and the machine learning system selects the third user interface of the plurality of user interfaces in response to the activity context of the user indicating that the user has a pace that meets a second threshold that is greater than the first threshold; and output the selected user interface for the user on a user device.

12. The system of claim 11, wherein, the training motion data and the motion data are collected from at least 2 sensors, and the at least 2 sensors are for measuring the motion of different parts of the user's body.

13. The system of claim 11, wherein, the training motion data and the motion data are collected from at least 2 sensors, and the at least 2 sensors are for measuring the motion of the user's body and the motion of the user's environment.

14. The system of claim 11, wherein, the step of train a context analyzer machine learning model, is further configured to:

collect the training motion data for the training activity context from a sensor for measuring movement of the user's body; and train the context analyzer machine learning model with the training motion data for the training activity context.

15. The system of claim 11, wherein, the step of train a response analyzer machine learning model, is further configured to:

collect the training usage data and the training user responses for the training activity context for the user interface; and train the response analyzer machine learning model with the training usage data and the training user responses for the training activity context for the user interface.

16. The system of claim 11, wherein the predicted user response is further based on usage data.

17. The system of claim 11, further configured to, associate a predetermined performance metric with the predicted user response.

* * * * *